United States Patent
Wu et al.

[11] Patent Number: 6,005,113
[45] Date of Patent: Dec. 21, 1999

[54] LONG WAVELENGTH DYES FOR INFRARED TRACING

[75] Inventors: Yexin Wu; Dieter H. Klaubert; Hee Chol Kang; Yu-Zhong Zhang, all of Eugene, Oreg.

[73] Assignee: Molecular Probes, Inc., Eugene, Oreg.

[21] Appl. No.: 08/856,422

[22] Filed: May 14, 1997

Related U.S. Application Data

[60] Provisional application No. 60/017,716, May 15, 1996.

[51] Int. Cl.[6] .............................. C09K 3/00; C09K 11/06; C09K 11/02; G01N 33/546

[52] U.S. Cl. .................... 548/110; 252/700; 252/301.16; 252/301.34; 252/301.35; 436/512; 436/528; 436/531; 436/532; 436/533; 436/534; 436/546; 436/172; 436/805; 548/405; 548/524; 548/527; 548/517; 548/539; 548/560; 548/564; 549/60; 549/61; 549/62; 549/70; 549/73; 549/473; 549/474; 549/475; 549/483; 549/59; 546/257; 546/262; 546/279.1; 546/280.4; 546/284.7; 546/283.4; 546/314; 546/340; 568/325; 568/328; 568/331; 568/332; 568/333

[58] Field of Search .................................. 436/512, 528, 436/531, 532, 533, 534, 546, 172, 805; 548/405, 110, 524, 427, 517, 539, 560, 564; 252/700, 301.16, 301.34, 301.35; 546/257, 262, 279.1, 280.4, 284.7, 283.4, 314, 340; 549/59, 60, 61, 62, 70, 73, 473, 474, 475, 483; 568/325, 328, 331, 332, 333

[56] References Cited

U.S. PATENT DOCUMENTS

| | | | |
|---|---|---|---|
| 4,326,008 | 4/1982 | Rembaum | 428/403 |
| 4,774,339 | 9/1988 | Haugland et al. | 548/405 |
| 5,187,288 | 2/1993 | Kang et al. | 548/110 |
| 5,248,782 | 9/1993 | Haugland et al. | 548/110 |
| 5,274,113 | 12/1993 | Kang et al. | 548/405 |
| 5,326,692 | 7/1994 | Brinkley et al. | 435/6 |
| 5,338,854 | 8/1994 | Kang et al. | 548/110 |
| 5,433,896 | 7/1995 | Kang et al. | 252/700 |
| 5,573,909 | 11/1996 | Singer | 435/6 |

OTHER PUBLICATIONS

Maekawa, et al., Chem. Abs. 93, 187727c (1980).
Weygand, et al., Chem. Ber. 89, (1956), pp. 1994–1999.
Dierichs, et al., Chem. Ber. 90, (1957), pp. 1208–1214.
Newman, J. Org. Chem. 26, (1961), pp. 2630–2633.
Kotali, et al., Tet. Lett. 28, (1987), pp. 4321–4322.
Svirevski et al., Chem. Abs. 79, 126122r (1973).
Minchev, et al., Chem. Abs. 82, 72716d, 1975.
Robertson, et al., J. Appl. Physiol. 82, (1997), pp. 943–953.
Ugelstad, et al., Adv. Colloid & Interface Science 13, (1980), pp. 101–140.

*Primary Examiner*—D Margaret M Mach
*Attorney, Agent, or Firm*—Allegra J. Helfenstein; Anton E. Skaugset

[57] ABSTRACT

The invention relates to fluorescent dyes that are substituted or unsubstituted derivatives of 1-(isoindolyl)methylene-isoindole that are bound through both isoindole nitrogens to a boron difluoride moiety, forming a fluorescent dibenzopyrromethenboron difluoride compound

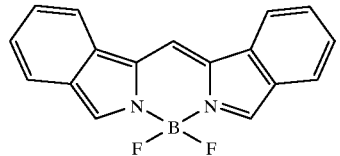

that is further substituted by bathochromic substituents that are aryl or heteroaryl moieties further substituted by an additional aryl or heteroaryl, that is itself optionally further substituted by an additional aryl or heteroaryl. These aryl and heteroaryl groups are separated by a covalent bond, or by an ethenyl, butadienyl or hexatrienyl linkage. The dyes of the invention are particularly useful as labels for carriers, particularly polymeric microparticles. The resulting microparticles have a long-wavelength fluorescence emission, and possess utility for tracing flow in biological systems, particularly in tracing blood flow.

38 Claims, 2 Drawing Sheets

LONG WAVELENGTH DYES FOR INFRARED TRACING

This application claims the benefit of U.S. Provisional Application No. 60/017,716, filed May 15, 1996.

This invention was made in part with government support under Grant No. 1 R43 AI32831-01 awarded by the National Institute of Allergy and Infectious Diseases (National Institutes of Health). The U.S. government has certain rights in this invention.

FIELD OF THE INVENTION

The present invention relates to fluorescent compounds, in particular fluorescent dyes having a core structure that is a 3,4:3',4'-dibenzopyrrometheneboron difluoride that are additionally substituted by a first heteroaryl or aryl substituent that is further substituted by a second aryl or heteroaryl substituent, that is in turn optionally further substituted by a third additional aryl or heteroaryl substituent. The dyes of the present invention are useful as detection reagents, and are optionally incorporated in a variety of materials, particularly polymeric microparticles. The microparticles thereby labeled possess particular utility for determining the flow of biological fluids, particularly blood.

BACKGROUND OF THE INVENTION

Dyes in general, and fluorescent dyes in particular, are often used to directly stain or label a sample so that the sample can be identified or quantitated. For instance, such dyes may be added as part of an assay for a biological target analyte, as a detectable tracer element in a biological or non-biological fluid, or for such purposes as photodynamic therapy of tumors, in which a dyed sample is irradiated to selectively destroy tumor cells and tissues, or to photoablate arterial plaque or cells, usually through the photosensitized production of singlet oxygen.

Fluorescent dyes with longer wavelength absorption and emission are particularly useful in conjunction with materials of biological origin such as blood, urine, fecal matter, cells and tissues, where background or inherent fluorescence or absorption often interferes with detection of the added fluorescent dye. Furthermore, biological specimens often have decreasing levels of both absorption and fluorescence emission as the illumination energy approaches the infrared. In addition, numerous biological and nonbiological applications of long wavelength dyes exist, including use as laser dyes, or in electronics as optical memory elements using relatively low cost illumination sources such as laser diodes. Consequently, dyes that possess these spectral properties have potential utility in biological and non-biological applications.

A variety of dipyrrometheneboron difluoride dyes (4,4-difluoro-4-bora-3a,4a-diaza-s-indacenes) have previously been described, by these inventors, and others, in which substituents are attached by a single covalent bond, including U.S. Pat. No. 4,774,339 to Haugland et al. and U.S. Pat. No. 5,274,113 to Kang et al. (reactive substituents), U.S. Pat. No. 5,248,782 to Haugland et al. (heteroaryl substituents), U.S. Pat. No. 5,187,288 to Kang et al. (ethenyl substituents), and U.S. Pat. No. 5,338,854 to Kang et al. (fatty acid substituents). All of the above patents describe fluorescent dyes and conjugates of fluorescent dyes based on the dipyrrometheneboron difluoride core structure shown below:

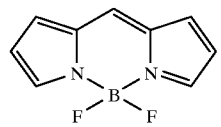

In addition, dipyrrometheneboron difluoride dyes incorporating fused aromatic rings (dibenzopyrrometheneboron difluoride dyes, structure shown below) have been described by Kang et al. (U.S. Pat. No. 5,433,896 (1995); incorporated by reference). The dibenzopyrrometheneboron difluoride dyes possess longer wavelengths than other, previously described dipyrrometheneboron difluoride dyes.

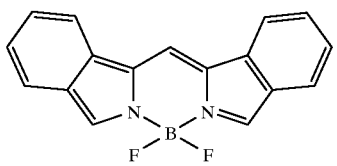

The dyes of the present invention typically possess even longer wavelength excitation and emission bands than previously described dipyrrometheneboron difluoride dyes, including dibenzopyrrometheneboron difluoride dyes. Like the dibenzopyrrometheneboron difluoride dyes, the spectral properties of the dyes of the present invention are substantially insensitive to the chemical environment of the dye, even when compared to the previously described dipyrrometheneboron difluoride dyes. Practically this means that the absorbance and emission of the dyes differ only slightly when measured in different solvents. The subject dyes are relatively stable to photobleaching, remaining intensely fluorescent even when constantly illuminated. Finally, the dyes of the present invention exhibit very long wavelength excitation and emission bands, thereby showing enhanced utility in sample systems that possess transparency primarily in the infrared region, or where the use of infrared wavelengths is particularly advantageous.

SUMMARY OF THE INVENTION AND DESCRIPTION OF PREFERRED EMBODIMENTS

Figure 1:
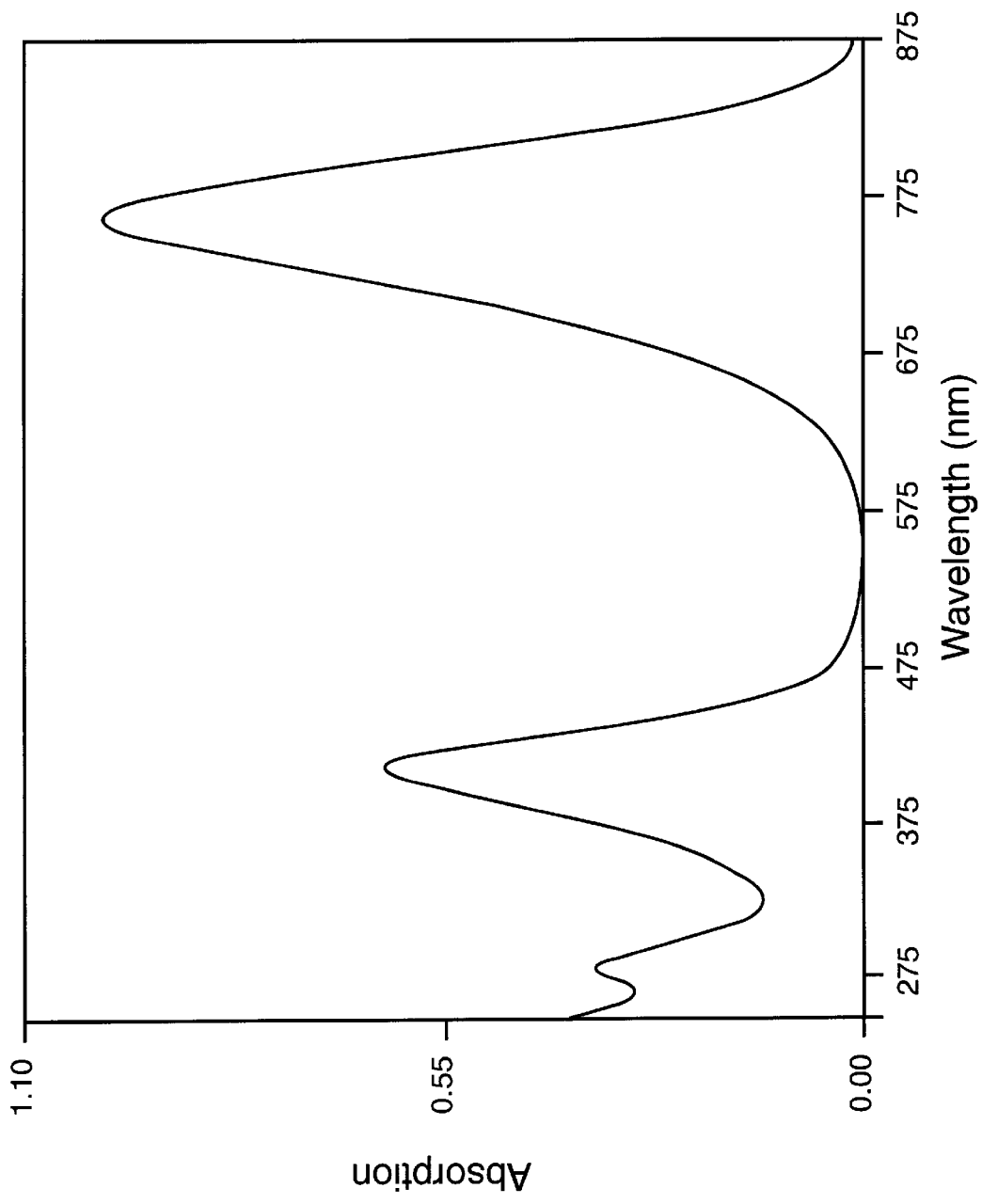
FIG. 1: The absorption spectrum of a dichloromethane solution of Compound 6. Absorption maximum occurs at 766 nm.
Figure 2:
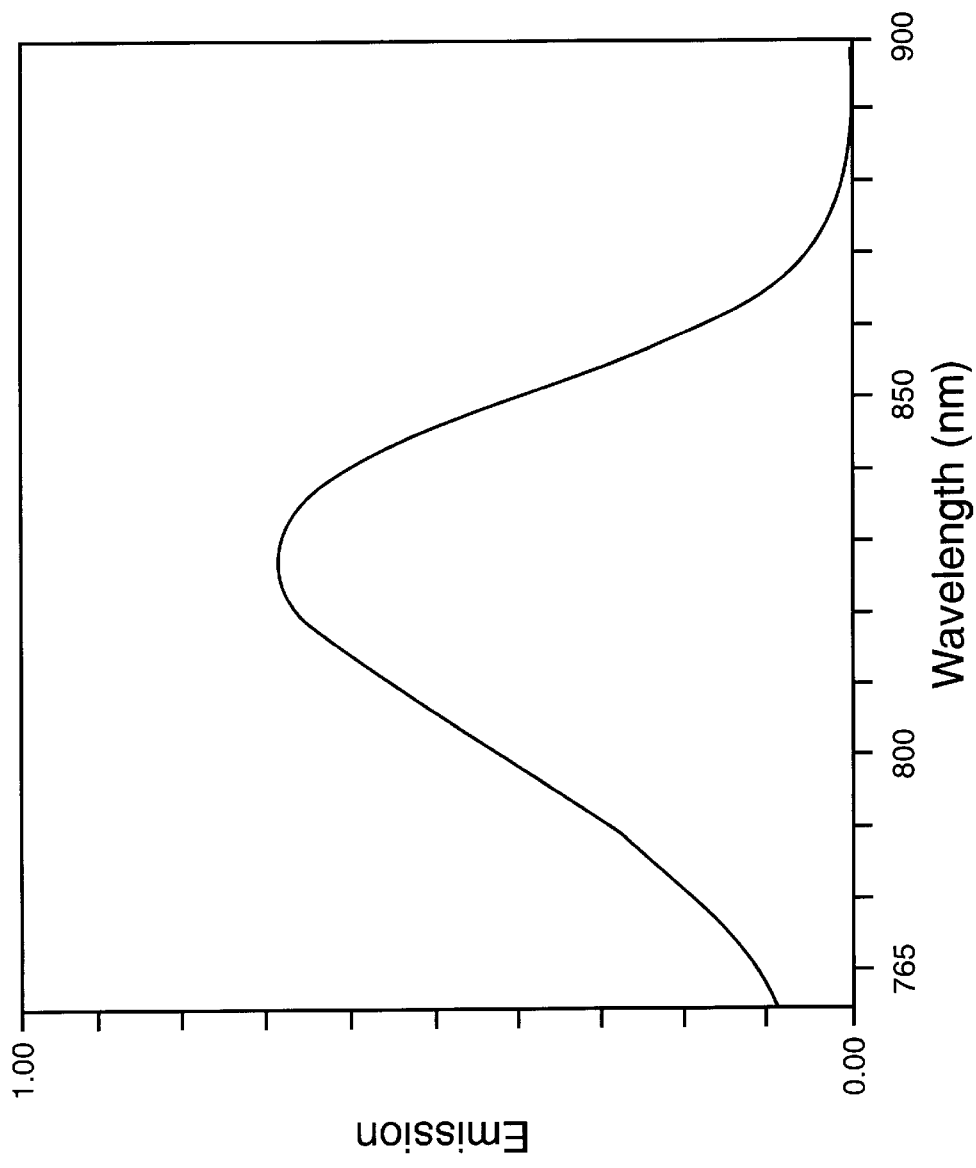
FIG. 2: The emission spectrum of a dichloromethane solution of Compound 6. Emission maximum occurs at 831 nm.

The compounds of the present invention are substituted or unsubstituted derivatives of 1-(isoindolyl)methyleneisoindole that are bound through both isoindole nitrogens to a boron difluoride moiety, forming a fluorescent dibenzopyrrometheneboron difluoride compound whose fluorescence properties are further modified by the substitution of at least one bathochromic moiety that is an aryl or heteroaryl substituent that is further substituted by one or more additional aryl or heteroaryl substituents, bound in series, and separated by a covalent bond or by an ethenyl, butadienyl or hexatrienyl linkage.

The benzo rings of the dibenzopyrrometheneboron difluoride core structure of the dyes of the present invention are optionally substituted by substituents that are used to modify the spectral properties, solubility or other physical properties of the dye. The dyes are also optionally substituted by additional fused benzo rings or fused heteroaromatic rings.

As used herein, all alkyl portions of alkyl, alkoxy, alkoxycarbonyl, acyloxy, perfluoroalkyl, alkylthio, monoalkylamino, dialkylamino or alkylamido substituents contain 1–18 carbon atoms in an arrangement that is either linear or branched, saturated or unsaturated. Typically, the alkyl portions contain 1–10 carbons atoms, preferably 1–6 carbon atoms. The alkyl portions of such substituents are optionally further substituted by H, halogen, cyano, amino, amido, hydroxy, carboxy, alkali or ammonium salt of carboxy, mercapto, sulfo, or alkali or ammonium salt of sulfo.

As used herein, where a ring substituent is ARYL, ARYL is defined as an aromatic or polyaromatic substituent containing 1 to 4 aromatic rings (each ring containing 6 conjugated carbon atoms and no heteroatoms) that are optionally fused to each other or bonded to each other by carboncarbon single bonds. ARYL is bound to the dye by a single bond and is optionally substituted as described below.

Specific examples of the ARYL moiety include, but are not limited to, substituted or unsubstituted derivatives of phenyl, biphenyl, o-, m-, or p-terphenyl, 1-naphthyl, 2-naphthyl, 1-, 2-, or 9-anthryl, 1-, 2-, 3-, 4-, or 9-phenanthrenyl and 1-, 2- or 4-pyrenyl. Preferably ARYL is phenyl, substituted phenyl, naphthyl or substituted naphthyl. The choice of ARYL moieties is dependent on the properties desired for the resulting dye.

As used herein, where a ring substituent is HETEROARYL, HETEROARYL is defined as a 5- or 6-membered heteroaromatic ring that is optionally fused to an additional six-membered aromatic ring(s), or is fused to one 5- or 6-membered heteroaromatic ring. The heteroaromatic rings contain at least 1 and as many as 3 heteroatoms that are selected from the group consisting of O, N or S in any combination. HETEROARYL is attached to the dye by a single bond, and is optionally substituted as defined below.

Specific examples of the HETEROARYL moiety include, but are not limited to, substituted or unsubstituted derivatives of 2- or 3-furyl; 2- or 3-thienyl; N-, 2- or 3-pyrrolyl; 2- or 3-benzofuranyl; 2- or 3-benzothienyl; N-, 2- or 3-indolyl; 2-, 3- or 4-pyridyl; 2-, 3- or 4-quinolyl; 1-, 3-, or 4-isoquinolyl; 2-, 4-, or 5-(1,3-oxazolyl); 2-benzoxazolyl; 2-, 4-, or 5-(1,3-thiazolyl); 2-benzothiazolyl; 3-, 4-, or 5-isoxazolyl; N-, 2-, or 4-imidazolyl; N-, or 2-benzimidazolyl; 1- or 2-naphthofuranyl; 1- or 2-naphthothienyl; N-, 2- or 3-benzindolyl; 2-, 3-, or 4-benzoquinolyl; 1-, 2-, 3-, or 4-acridinyl. Preferably HETEROARYL is substituted or unsubstituted pyridyl, thienyl, pyrrolyl, indolyl, oxazolyl, benzothiazolyl or benzoxazolyl. More preferably, HETEROARYL is thienyl or pyrrolyl.

The ARYL and HETEROARYL moieties are unsubstituted or optionally and independently substituted by H, halogen, cyano, sulfo, alkali or ammonium salt of sulfo, nitro, carboxy, alkali or ammonium salt of carboxy, alkyl, perfluoroalkyl, alkoxy, alkylthio, amino, monoalkylamino, dialkylamino or alkylamido. Where ARYL or HETEROARYL is substituted by a dialkylamino substituent, the alkyl groups of the dialkylamino, when taken in combination with the ARYL or HETEROARYL ring, optionally font one or two fused, saturated 5- or 6-membered rings, as depicted below for a pendent dialkylaminophenyl substituent:

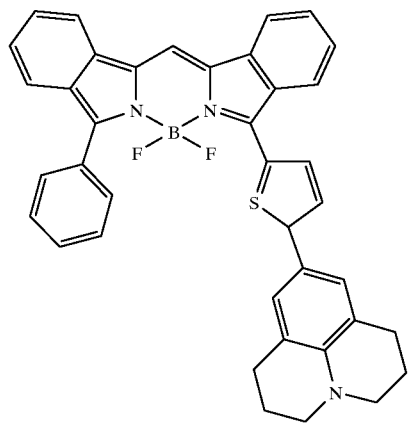

Specific embodiments of the dyes of the present invention are described by the formula:

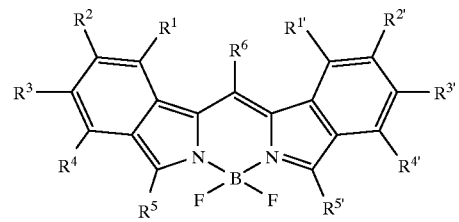

wherein the substituents $R^5$ and $R^{5'}$ are bathochromic substituents having the formula -α-K-β, wherein K is a single covalent bond, or K is a linkage that is an ethenyl, butadienyl or hexatrienyl moiety. Each α and β moiety is independently an ARYL or a HETEROARYL. The β moiety is optionally further substituted by -L-γ where L is a single covalent bond or an ethenyl, butadienyl or hexatrienyl moiety and the γ moiety is an ARYL or a HETEROARYL. For all embodiments, at least one α, β or γ is a HETEROARYL.

Typically, where any of α, β or γ is an ARYL, ARYL has only 1–2 fused aromatic rings. In one embodiment of the invention, at least one of α, β and γ (when present) is a HETEROARYL. In another embodiment of the invention, each α is a HETEROARYL. In yet another embodiment of the invention, each α, β and γ is independently a phenyl, naphthyl, thienyl, furyl, pyrrolyl or pyridyl ring. In yet another embodiment, each α is a thienyl. In yet another embodiment of the invention, each β and γ are independently a thienyl or a phenyl. In another embodiment of the invention, the terminal ring in the bathochromic substituent (γ, if present, otherwise β) is substituted by an alkoxy or dialkylamino, preferably para to the point of attachment of the covalent linkage. Preferably, the terminal ring in the bathochromic substituent is a para-alkoxyphenyl, more preferably a para-methoxyphenyl. Preferably, $R^5$ and $R^{5'}$ are both substituted by the same bathochromic substituent.

The substituent $R^6$ is one of H, CN, alkyl, cycloalkyl having 3–6 carbons, perfluoroalkyl, ARYL or HETEROARYL. Preferably, $R^6$ is H or ARYL.

The ring substituents $R^1$, $R^2$, $R^3$, $R^4$, $R^{1'}$, $R^{2'}$, $R^{3'}$, and $R^{4'}$ are independently H, halogen (including F, Cl, Br or I), cyano, sulfo, alkali or ammonium salts of sulfo, carboxy, alkali or ammonium salts of carboxy, alkyl, perfluoroalkyl, alkoxy, alkoxycarbonyl, acyloxy, alkylthio, nitro, amino, monoalkylamino, dialkylamino, or alkylamido. Alternatively, one or more of $R^1$, $R^2$, $R^3$, $R^4$, $R^{1'}$, $R^{2'}$, $R^{3'}$, and $R^{4'}$ is -J-ARYL, -J-HETEROARYL, or a polymerizable moiety; or two adjacent positions are fused to form an additional BENZO or HETERO ring.

The covalent linkage J is independently a single covalent bond, —O—, —NH—, —(C=O)—NH—, —NH—(C=O)—. Alternatively, J is an ethenyl, butadienyl, or hexatrienyl moiety;

Where a ring is substituted by BENZO, any two adjacent positions of $R^1$, $R^2$, $R^3$, $R^4$, $R^{1'}$, $R^{2'}$, $R^{3'}$, and $R^{4'}$ are bonded by —$CR^7$=$CR^8$—$CR^9$=$CR^{10}$— to form a benzo-fused derivative in which the substituents $R^7$, $R^8$, $R^9$ and $R^{10}$ are independently selected from the same set of substituents as permitted for $R^1$, $R^2$, $R^3$, $R^4$, $R^{1'}$, $R^{2'}$, $R^{3'280}$, and $R^{4'}$, with the exception of additional BENZO substituents. Preferably, $R^7$, $R^8$, $R^9$ and $R^{10}$ are independently H, dialkylamino, alkoxy, sulfo or salts of sulfo. The dyes of the present invention are optionally substituted by up to four BENZO substituents, with no more than two additional BENZO groups present on a single aromatic ring. More typically, there is only one additional BENZO group present on a single aromatic ring.

Where a ring is substituted by HETERO, any two adjacent positions of $R^1$, $R^2$, $R^3$, $R^4$, $R^{1'}$, $R^{2'}$, $R^{3'}$, and $R^{4'}$ when taken in combination form a fused 5- or 6-membered heteroaromatic ring containing a hetero atom selected from the group consisting of O, S and N, provided that none of $R^1$, $R^2$, $R^3$, $R^4$, $R^{1'}$, $R^{2'}$, $R^{3'}$, and $R^{4'}$ is incorporated into more than one HETERO substituent. The remaining positions on the fused heteroaromatic ring are optionally and independently substituted H, halogen, cyano, sulfo, alkali or ammonium salt of sulfo, carboxy, alkali or ammonium salt of carboxy, alkyl, perfluoroalkyl, alkoxy, alkylthio, amino, monoalkylamino, dialkylamino or alkylamido. Typically, HETERO is substituted only by hydrogen.

Typically, no more than two of $R^1$, $R^2$, $R^3$ or $R^4$ is a nonhydrogen substituent. Typically no more than two of $R^{1'}$, $R^{2'}$, $R^{3'}$ and $R^{4'}$ is a nonhydrogen substituent. In one embodiment of the invention, $R^3$ and $R^{3'}$ are both non-hydrogen substituents, preferably alkoxy, more preferably methoxy. Preferably, $R^1$, $R^2$, $R^3$, $R^4$, $R^{1'}$, $R^{2'}$, $R^{3'}$, and $R^{4'}$ are independently H, dialkylamino, alkoxy, sulfo or salts of sulfo.

While highly polar substituents, such as sulfo, salts of sulfo, carboxy and salts of carboxy can be utilized to enhance the solubility of the dyes of the invention in polar solvents, in one embodiment of the invention, the dye itself is not substituted by these polar substituents, nor is any substituent on the dye further substituted by sulfo, salt of sulfo, carboxy or salt of carboxy. This embodiment of the dyes of the dyes of the invention is preferred where the dyes are selected to be incorporated into a non-polar carrier, such as a polymeric microparticle.

In an additional embodiment of the invention, the dye is further substituted by a polymerizable moiety, suitable for copolymerization with a suitable monomer. Typically, the polymerizable moiety will incorporate an alkenyl group, preferably a vinyl group. The alkenyl group is optionally substituted directly on the dye at one of $R^1$, $R^2$, $R^3$, $R^4$, $R^5$, $R^6$, $R^{1'}$, $R^{2'}$, $R^{3'}$, $R^{4'}$ and $R^{5'}$, or attached to the dye via a covalent linkage that optionally incorporates one or more ether (—O—), ester (—O—(C=O)—), amide (—NH—(C=O)—), thioether (—S—) or sulfonamide (—NH—S(O)$_2$—) linkages, provided that the nature of the linkage does not interfere with the ability of the alkenyl group to copolymerize with a suitable monomer. Typically, each dye will be substituted by only one polymerizable moiety. Where a dye is substituted by a polymerizable moiety, each K and L present on the dye is required to be a single covalent bond (to avoid incorporating either K or L into the resulting polymer matrix). In one embodiment, the polymerizable moiety is attached to the dye on the terminal ring of the bathochromic substituent (β, if γ is not present). Preferably, the polymerizable moiety is attached to the terminal ring para to the point of attachment of K or L.

Table 1 shows the chemical structures of selected embodiments of the dyes of the present invention.

TABLE 1

Selected Dyes of the Present Invention

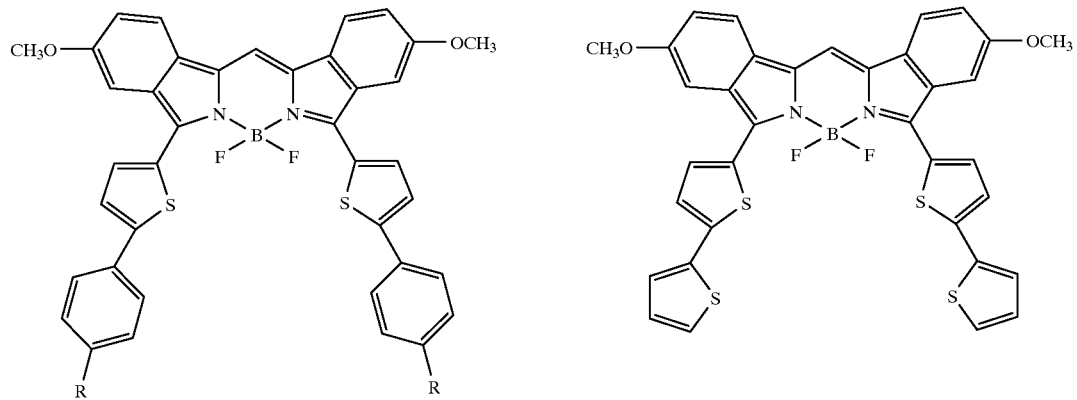

R = OCH$_3$, N(CH$_3$)$_2$

TABLE 1-continued

Selected Dyes of the Present Invention

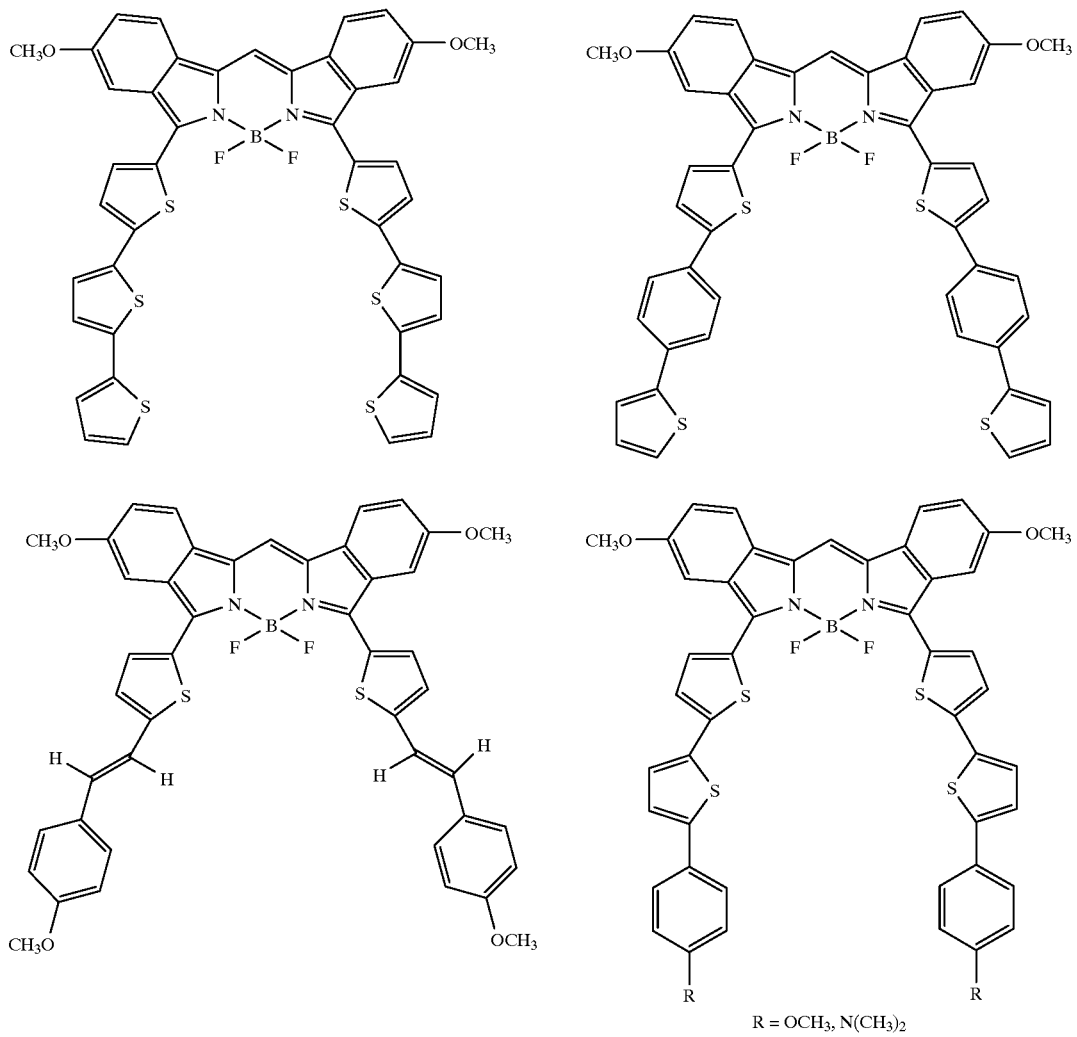

Preferably, the dyes of the present invention possess an absorption maximum at a wavelength of 700 nm or longer, more preferably at a wavelength of 730 nm or longer. Preferably, the dyes of the invention possess an emission maximum at a wavelength of 770 nm or longer, preferably 800 nm or longer.

Spectral properties of selected dyes of the present invention are given in Table 2.

TABLE 2

| Compound | Absorbance Max. (nm) | $\epsilon \times 10^{-3}$ (cm$^{-1}$M$^{-1}$) | Emission Max. (nm) |
| --- | --- | --- | --- |
| 3 | 765 | 66.8 | 827 |
| 6 | 766 | 65.4 | 831 |

Absorption maxima and emission maxima were measured in dichloromethane solution. Extinction coefficients ($\epsilon$) are shown at their absorption maxima in dichloromethane solution.

SYNTHESIS

A particularly suitable synthesis for symmetrically-substituted dibenzopyrromethenoboron difluoride dyes requires initial preparation of a suitably substituted 2-acylacetophenone precursor or one of its fused analogs:

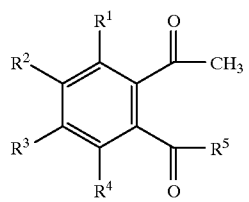

Numerous 2-acylacetophenones undergo condensation in the presence of ammonia or ammonium salts to give the dibenzopyrromethene intermediate necessary to prepare the subject dyes (Maekawa et al. supra). While a number of reactions have been reported for the preparation of 2-acylacetophenone or structurally related precursors (e.g.

Weygand et al. CHEM. BER. 89, 1994 (1956), Dierichs et al. CHEM. BER. 90, 1208 (1957) and Newman J. ORG. CHEM. 26, 2630 (1961)), the general method reported by Kotali et al. (TET. LETT. 28, 4321 (1987)) is particularly useful for the preparation of these key precursors.

Typically, the 2-acylacetophenone precursor is selected so as to yield the desired dibenzopyrrometheneboron difluoride dye. The precursors must therefore be appropriately substituted or possess substituents that are suitably protected and can be deprotected after the dibenzopyrrometheneboron difluoride dye is prepared.

Substituents at the $R^5$ position can be easily incorporated into the 2-acylacetophenone precursor. The requisite hydrazide ($R^5$—(C=O)—$NHNH_2$) is commercially available, or can be readily prepared from the corresponding acid, ester or other derivatives and hydrazine by reactions familiar to anyone skilled in the art. Condensation of $R^5$—(C=O)—$NHNH_2$ with the carbonyl moiety of the acetyl group is usually facile. Appropriately-substituted or fused variations of the 2-hydroxyacetophenone precursor are readily prepared by a Fries rearrangement of the phenolic acetates (ORG. SYNTH. coll. vol. 2, 543).

In particular, for those dyes wherein $R^5$ or $R^{5'}$ is a bathochromic substituent (-α-K-β), the bathochromic substituent is readily incorporated into the 2-acylacetophenone precursor, typically using commercially available or otherwise well-known precursors (Examples 1, 4 and 7). As stated above, typically each α, β and γ is independently a phenyl, naphthyl, thienyl, furyl, pyrrolyl or pyridyl ring. Preferably, each α is a thienyl, and each β and γ are independently a thienyl or a phenyl. The terminal ring in the bathochromic substituent (γ, if present, otherwise β) is optionally substituted by an alkoxy or dialkylamino, preferably para to the point of attachment of K or L. In this embodiment, the terminal ring in the bathochromic substituent is preferably a para-alkoxyphenyl, more preferably a para-methoxyphenyl.

The condensation of 2-acylacetophenones is only useful for producing intermediates for which the substituent $R^6$ is hydrogen. If a non-hydrogen $R^6$ substituent is desired, an alternate synthesis is required. As described in the Chemical Abstracts 79:126122r (1973) and 82:72716d (1975) (Svirevski et al. and Minchev et al., respectively) dibenzopyrromethene intermediates where $R^6$ is phenyl can be prepared by heating an appropriately substituted hydrindenone with aqueous ammonia in a sealed tube. This synthetic route can be modified by methods known in the art to yield other desired $R^6$ substituents.

Upon synthesizing an appropriately substituted (or protected) dibenzopyrromethene intermediate, the formation of the dibenzopyrrometheneboron difluoride dye is accomplished by reaction of the intermediate with boron trifluoride in combination with an organic or inorganic base. Boron trifluoride is preferably used as an ether complex, due to the difficulty of handling the gaseous reagent. Suitable bases include, but are not limited to, trimethylamine, triethylamine, N,N-diisopropylethylamine, N,N,N',N'-tetramethylethylenediamine, 1,8-bis(dimethylamino) naphthalene, diazabicyclooctane, diazabicycloundecene, 4-dimethylaminopyridine, 4-pyrrolidinopyridine and other similar bases. Most of the resulting dibenzopyrrometheneboron difluoride dyes are chemically stable, highly colored compounds that can be readily purified by crystallization or preparative chromatography.

Symmetric dibenzopyrrometheneboron difluoride dyes (where $R^1=R^{1'}$, $R^2=R^{2'}$, $R^3=R^{3'}$, $R^4=R^{4'}$ and $R^5=R^{5'}$) are readily prepared from the use of a single, appropriately substituted 2-acylacetophenone precursor. After condensation, the resulting dibenzopyrromethene intermediate is symmetrical, and treatment with boron trifluoride yields a symmetrical fluorescent dye.

Unsymmetric dibenzopyrrometheneboron difluoride dyes are the dyes of the present invention for which at least one of the substituents at $R^1$, $R^2$, $R^3$, $R^4$ or $R^5$ differs from the corresponding substituent at $R^{1'}$, $R^{2'}$, $R^{3'}$, $R^{4'}$ or $R^{5'}$. Unsymmetric dyes are prepared analogously to the symmetric dyes, excepting that two different 2-acylacetophenone precursors, in approximately equivalent proportions, are condensed to give an unsymmetric dibenzopyrromethene intermediate. This condensation process necessarily yields three products in an approximately statistical distribution: Two symmetric dibenzopyrromethene intermediates, and one (desired) unsymmetric intermediate. It is usually necessary to chromatographically separate the asymmetric dye from the two different symmetric dyes. The difficulty in preparing pure asymmetric dyes is typically greater, and the yield is typically much lower, than that of the symmetrical dyes. However, this synthetic route can be used, if a dye having a particular spectral properties is desired, or when preparing a dye that is further substituted by a polymerizable moiety on one of $R^5$ or $R^{5'}$.

The described method for synthesis of the key intermediates permits incorporation of a wide variety of substituents at any position of the ultimate dibenzopyrrometheneboron difluoride dye, except at the bridgehead position in the boradiazine ring. Bridgehead substituents can be incorporated using alternative syntheses (Svirevski et al. and Minchev et al., supra).

APPLICATIONS

The long-wavelength excitation and emission bands of dibenzopyrrometheneboron difluoride dyes, coupled with their high absorbance and quantum yields, give the subject dyes utility in a variety of applications.

As discussed above, the long wavelength excitation bands of the subject dyes allow the use of inexpensive laser diodes as excitation sources. In an additional aspect of the invention, the dyes of the invention possess utility as laser dyes according to methods known in the art (e.g. Boyer et al., supra, incorporated by reference).

In another aspect of the invention, the dyes of the present invention can be used to stain samples and sample solutions. Typically the dyes of the present invention are highly colored, and can be detected visually or calorimetrically. Alternatively, the dye is detected using its fluorescence properties. To observe fluorescence, the sample is first excited by a light source capable of producing light at or near the wavelength of maximum absorption of the dye, such as a visible lamp, a laser, or even sunlight. Preferably the dye is excited at a wavelength equal to or greater than about 700 nm, more preferably equal to or greater than about 730 nm. The fluorescence of the dye is detected qualitatively or quantitatively by detection of the resultant light emission at a wavelength of greater than about 770 nm, preferably greater than about 800 nm. The emission is detected by means that include photographic film, or the use of current instrumentation such as fluorometers, quantum counters, plate readers, epifluorescence microscopes and flow cytometers, or by any means for amplifying the signal, such as a photomultiplier or cooled charge-coupled device (CCD).

The dyes of the present invention are particularly useful for acting as tracers in systems that are substantially transparent to infrared radiation. This method typically comprises adding to the system a dye of the present invention, optionally present in a carrier, and illuminating the system at a wavelength that will produce a detectable fluorescence response from the dye. After illumination, the resulting detectable fluorescence response is observed, and the location of said detectable fluorescence response within the sample reveals the location of the dye. Particularly, if a specified period of time is allowed to pass after addition of the dye, but before illumination and observation, the movement of the dye from the point of addition can be correlated with any flow characteristics of the sample under study.

While the dyes themselves are useful as stains for systems that are largely non-polar, in order to probe fluid dynamics in an aqueous environment, the dyes of the invention are typically present in a natural or synthetic carrier that is essentially non-polar. Suitable carriers include, but are not limited to, polymeric microparticles, synthetic nanotubes, artificial liposomes and biological particles. Typically, where the carrier is a biological particle, the carrier is a cell, such as a bacteria, yeast cell or blood cell, that has been labeled with the dyes of the invention. Preferably the carrier is a polymeric microparticle.

Where the carrier is a polymeric microparticle, the polymer microparticle can be prepared from a variety of polymers including, but not limited to nitrocellulose, polystyrene (including high density polystyrene latexes such as brominated polystyrene), poly(methyl methacrylate) and other polyacrylic acids, polyacrylonitrile, polyacrylamide, polyacrolein, polydimethylsiloxane, polybutadiene, polyisoprene, polyurethane, polyvinylacetate, polyvinylchloride, polyvinylpyridine, polyvinylbenzylchloride, polyvinyltoluene, polyvinylidene chloride, and polydivinylbenzene. Preferably, the microparticles of the invention are prepared from pomerizable monomers. More preferably, the polymer microparticle is prepared from polystyrene or polyacrylamide. Preferred polymers are polystyrene-based, optionally copolymerized with a cross-linking agent such as divinylbenzene. Suitable particles that are also magnetic are available from Dynal (Lake Success, N.Y.) and other sources.

The microparticles can be manufactured in a variety of useful sizes and shapes. They may be spherical or irregular in shape, and range in size from about 0.01 micrometers to about 100 micrometers. Typically, the labeled microparticles are spherical (microspheres). Typically the microparticle is a microsphere having a diameter of about 1 $\mu$m to about 25 $\mu$m. In another embodiment, the microparticle is a microsphere having a diameter of less than about 5 micrometers. In one embodiment, for determining flow in the vasculature of a test subject, the microparticles of the present invention have a diameter of 10–15 micrometers. In another embodiment, where flow is determined in microvasculature, the microparticles have a diameter of 1–2 micrometers. The microparticles may be of uniform size and/or shape or non-uniform.

One or more species of dibenzopyrromethenboron difluoride dyes are internally incorporated into the polymeric microparticles, either covalently or non-covalently, using a variety of methodologies. Copolymerization of the polymer precursor with a dye-labeled monomer typically leads to internal covalent labeling (as described in U.S. Pat. No. 4,326,008 to Rembaum (1982)). Where the polymeric microparticle is allowed to swell in an organic solvent containing the dye(s) of interest, the microparticle is non-covalently labeled by simple diffusion (dye-loading; Example 8), essentially as described in U.S. Pat. No. 5,326,692 to Brinkley et al. (1994) (incorporated by reference). Finally, the microparticle can be internally and noncovalently labeled by entrapment of the selected dye(s) by polymerization of the polymer precursor in the presence of the non-crossreactive dye (Examples 13 and 14).

While polymeric microparticles manufactured from nitrocellulose and polydimethylsiloxane may be labeled by swelling and dye-diffusion, neither copolymerization nor dye-entrapment are suitable methods for preparation of labeled microparticles composed of these polymers, as these methods are principally useful only for microparticles prepared by polymerization of alkenyl-containing monomers.

Typically, the dyes of the invention are incorporated non-covalently within a polymer microparticle directly from an organic solution according to known methods (dye-loading). The neutral charge and lipophilic character of most of the dyes of the invention facilitates their diffusion into and retention in nonpolar polymers such as polystyrene. Any polymer in which the dye is soluble at greater than about 0.01% by weight and from which the dye does not appreciably leach when brought into contact with water is suitable.

The carrier is optionally labeled with a plurality of dyes, provided at least one of the incorporated dyes is a dye of the present invention. Typically, the carrier contains fewer than 12 dyes. In one embodiment, the carrier is a microparticle that contains 9 or fewer dyes. In another embodiment, the microparticle contains 6 or fewer dyes. In yet another embodiment, the microparticle contains 4 or fewer dyes. The concentration and spectral properties of the dyes are optionally selected to prevent energy transfer between dyes incorporated in the carrier, or to facilitate electron transfer between such dyes.

Where an extended Stokes shift between excitation and emission wavelengths is desired, incorporation of multiple dyes into a suitable carrier with sufficient overlap between the absorption and emission peaks of the respective dyes, typically at a dye concentration of 1–5% by weight in the particle, results in effectively complete excited state energy transfer (as described in U.S. Pat. No. 5,326,692, supra). Where the carrier is a microparticle, typically a plurality of fluorescent dyes is incorporated into the microparticle from an organic solvent. The dyes are incorporated sequentially or as a mixture. Where the physical characteristics of an individual dye (such as overall lipophilicity) require harsh dye-loading conditions, such as incorporation from dichloromethane solution, that dye is typically incorporated into the carrier first, with additional dyes being incorporated sequentially depending on the conditions required for those dyes.

While the dyes of the present invention allow for labeled microparticles to exhibit fluorescent emission in the infrared region, other dyes derived from dipyrrometheneboron difluoride (as described previously) are suitable for incorporation into the microparticle, offering a wide range of excitation ranges. In addition, suitable dyes having an absorbance in the ultraviolet, such as 1,6-diphenyl-1,3,5-hexatriene and 1,1,4,4-tetraphenyl-1,3-butadiene, are optionally incorporated into the microparticles, allowing excitation of the microparticle using ultraviolet radiation, and monitoring infrared fluorescence. Where a labeled microparticle possesses an extended Stokes shift, due to the presence of a plurality of incorporated dyes, excitation of the microparticle may typically be performed at any intermediate wavelength between the excitation band of the initial donor dye to the excitation band of the ultimate acceptor dye, allowing a single bead to be usefully excited by a variety of illumination sources.

Usefully labeled carriers contain an amount of fluorescent dye sufficient to make the carrier detectably fluorescent. The concentration of dye required depends on the sensitivity of the detection instrumentation. For example, when analyzed using a flow cytometer, the measured fluorescence intensity of the labeled microparticles is no less than 300, when detected in the FL3 channel with standard photomultiplier tube settings. Alternatively, the presence of too high a concentration of dye within a carrier typically results in quenching of the fluorescence of the dye, and a decrease in the overall fluorescence response of the carrier. Therefore, in order to be useful as a label or tracing agent, the fluorescent carriers of the present invention must be labeled with an amount of dye sufficient to generate detectable fluorescence upon illumination, but not a concentration of dye high enough to result in fluorescence quenching within the carrier.

Microparticles labeled with fluorescent dyes are optionally surface modified with members of specific binding pairs such as peptides, proteins, antibodies, avidins, biotin, digoxigenin, haptens, nucleotides, oligonucleotides, nucleic acids, carbohydrates, lectins or enzymes according to methods known in the art. These modified and labeled microparticles are then allowed to interact with their complementary specific binding pair member for the purpose of detection or quantitation of that member or for attachment to other materials, including other members of specific binding pairs such as in amplification or layering techniques, or in creating a variety of probes. A variety of assays and means for detection of certain biological components are therefore possible using the dyes of the present invention.

As they represent a highly uniform and reproducible point source of infrared radiation, the fluorescent microparticles of the present invention are also useful as standard signal sources for testing and calibrating instruments that detect infrared signals.

While the dyes of the present invention are useful as infrared tracers in a variety of systems, they are particularly advantageous in biological systems, particularly living systems. Although the free dyes themselves are useful as tracers, typically when used in biological samples the dye is present in a carrier that is a polymeric microparticle and the microparticles are used for monitoring transport mechanisms within the sample. The infrared emission of the labeled microparticles allow for the label to be detected through plant and animal tissue, which is largely transparent in the infrared wavelengths. In contrast to methods of tracing the flow of fluids and gases in the art, the sample or subject need not be killed and dissected in order to determine the location of the labeled particles. Analysis of fluid dynamics using the present invention can occur while the subject is alive, giving a more accurate view of the fluid dynamics of the system under study. Alternatively, according to methods in the art, the subject is killed and sectioned and the presence of labeled particles is determined in portions of the sample.

The sample under study is typically a biological sample. The sample can be a discrete organ, a tissue sample, or an entire animal. Where the sample is an animal, it is typically a mammal. Transport within a sample system is typically analyzed by adding a dye composition (typically the dye or dye-labeled carrier) to the sample, then illuminating the sample or a portion of the sample at a wavelength appropriate for generating a fluorescence response from the dye composition. The dye composition may then be located in the sample by localization of the fluorescence response. Typically, depending upon the length of time between addition of the dye composition and illumination and observation, the fluorescence response will have a characteristic distribution within the sample, corresponding to the localization of the dye compositions within the sample. In one embodiment, the distribution of fluorescence (and therefore of the dye-labeled carrier) indicates fluid movement within the sample. In another embodiment, the distribution of fluorescence indicates the volume of the circulatory or respiratory system under study. In yet another embodiment of the invention, continuous or repeated illumination and observation provides real time data on the movement of the dye composition within the sample. Illumination and detection of the dye composition in the sample is typically performed instrumentally using a microscope, a fluorometer or a flow cytometer.

Where the dye composition is used in biological systems, it is typically a polymeric microparticle labeled with the dyes of the present invention, preferably by non-covalent incorporation of the dye. The microparticle is typically a microsphere having a diameter of between about 0.01 micrometers and about 100 micrometers. Where the microspheres are used to measure or trace blood flow, the microspheres are typically 0.1 to 40 micrometers in diameter, more preferably 1 to 25 micrometers in diameter, and the microspheres are typically added to the sample as an aqueous suspension. Where the microspheres are used to measure or trace respiration, the microspheres are typically 0.1 to 5 micrometers in diameter, more preferably 1 to 3 micrometers in diameter, and the microspheres are typically added to the sample as an aerosol, for example by inhalation (as described by Robertson et al. J. APPL. PHYSIOL. 82, 943 (1997) and references therein).

In one embodiment of the invention, the labeled microsphere is surface modified with a member of a specific binding pair. In this embodiment, the distribution of the fluorescence response within the sample represents localization of the microsphere due to the presence of the complementary binding pair member. For example, modifying the surface of the microsphere with monoclonal antibodies directed at specific cancerous cells will result in localization of the microspheres where a tumor is present in the sample.

In one embodiment of the invention, fluorescent microparticles of the present invention are used to observe the effects of drugs on cardiovascular disease in animal test subjects. With the test subject under anesthesia, surgery is performed to expose the heart. The fluorescent microparticles of the present invention are injected into the test subject intravenously. Typically, 200 $\mu$L of a 0.1% suspension of infrared fluorescent microparticles is injected. At a determined time after the injection of the microparticles, the drug or drugs under study are injected. The movement of the microparticles in the heart tissue is then monitored by appropriate illumination and detection of the resulting infrared fluorescence. In particular, the speed of the microparticle movement, and the number of microparticles observed are correlated with drug efficacy.

Analogously to observing the effects of drugs on the cardiovascular system, the fluorescent microparticles of the invention are useful for evaluating the effects of therapeutics on other circulatory systems.

The fluorescent microparticles of the invention also possess utility for methodologies in developmental biology, particularly in monitoring embryonic development. The cell differentiation, tissue and organ formation in the embryo are then monitored by direct detection of the infrared fluorescence of the microparticles upon illumination. As a result of the transparency of the embryos to infrared radiation, the embryonic development may be monitored over time, or monitored constantly. In one embodiment of the invention, an embryo (having 4 cells, 8 cells or 16 cells) is microinjected with 0.1 μm fluorescent microparticles.

The microparticles of the invention are also highly useful for labeling plant tissue or tracing plant vasculature, as the emission of the current dyes occurs at longer wavelengths than that of the absorption of chlorophyll, which typically interferes with tracing studies involving fluorescence. The fluorescent microparticles of the invention are typically added to the liquid media taken up by the plant sample. By following the uptake, movement and location of the microparticles within the vasculature of the plant can be determined by infrared fluorescence, e.g. the effect of physiological conditions on the metabolism of the plant sample may be analyzed. For example, a variety of stimuli, from the effect of a specified light cycle, temperature variation and watering program, to the physiological results of incorporating nucleic acids or foreign proteins into the plant sample, may be monitored using the microparticles of the invention.

The examples below are given so as to illustrate the practice of this invention. They are not intended to limit or define the entire scope of this invention.

EXAMPLE 1

Preparation of 4-methoxy-2-(2-(5-(4-methoxyphenyl))thienoyl)acetophenone (Compound 1)

The following compound is prepared:

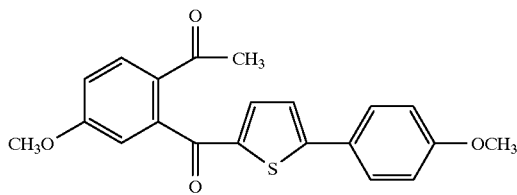

To a solution of 6.3 mL of n-butyllithium (2.5 M solution in hexane) in 50 mL of dry ether is added a solution of 3.0 g (15.8 mmol) of 2-(4-methoxyphenyl)thiophene in 20 mL of dry ether under $N_2$ atmosphere. The mixture is stirred at room temperature for 3 hours and then heated at reflux for 30 minutes. After the reaction mixture is cooled to −78° C. with dry ice and acetone bath, dry $CO_2$ gas is bubbled through the reaction mixture for 3 hours and the resulting solution is stirred at room temperature overnight. The reaction mixture is diluted with 200 mL of chloroform, washed with 1% HCl solution (200 mL) and with water (2×200 mL). The separated organic layer is dried over anhydrous $Na_2SO_4$ and concentrated under reduced pressure to give 1.8 g (50%) of 5-(4-methoxyphenyl)-2-thienoic acid.

To a solution of 1.8 g (7.7 mmol) of the thienoic acid in 1 mL of dry DMF and 30 mL of toluene is added 1.1 mL (15.4 mmol) of thionyl chloride and the mixture is heated at 80° C. for 3 hours. After cooling to room temperature, the solvent and excess thionyl chloride are removed under reduced pressure. The resulting residue is dissolved in 50 mL of dry THF and is added dropwise over a period of 30 minutes into a solution of 4.8 mL (154 mmol) of anhydrous hydrazine in 100 mL of dry THF while stirring at −30° C. After stirring at room temperature for 2 hours, 100 mL of water is added to the reaction mixture. The desired product is extracted with chloroform (4×100 mL), dried over anhydrous $Na_2SO_4$ and concentrated to give 1.5 g (75%) of 5-(4-methoxyphenyl)-2-thienoylhydrazine.

A solution of 1.5 g (6.0 mmol) of the above hydrazine and 2.0 g (12 mmol) of 4-methoxy-2-hydroxyacetophenone in 40 mL of 1-propanol is heated at reflux for 48 hours. After cooling to room temperature, the resulting solid is collected by filtration, washed with 1-propanol and dried to give 1.9 g (80%) of N-(5-(4-methoxyphenyl)-2-thienoyl)hydrazone of 4-methoxy-2-hydroxyacetophenone.

To a suspension of 1.9 g (5.0 mmol) of the above hydrazone in 100 mL of THF is added 2.6 g (6.0 mmol) of lead tetraacetate in small portions over a period of 10 minutes. After stirring at room temperature for 1 hour, the resulting solid is removed by filtration. The filtrate is concentrated under reduced pressure to give a crude product. It is purified by silica gel column chromatography using 1% methanol in chloroform as eluant to give 1.3 g (60%) of Compound 1.

EXAMPLE 2

Preparation of 5-methoxy-1-((5-methoxy-3-(2-(5-(4-methoxyphenyl))thienyl)-2H-isoindol-1-yl) methylene)-3-(2-(5-(4-methoxyphenyl)thienyl))-1H-isoindole (Compound 2)

The following compound is prepared:

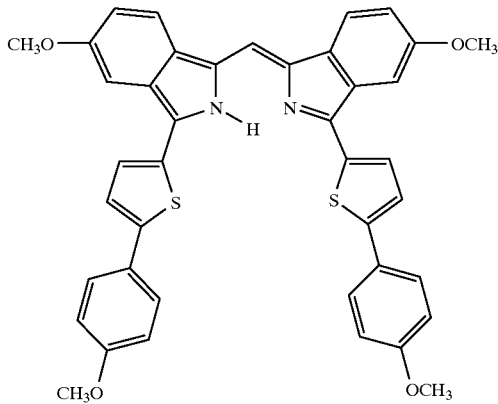

To a solution of 0.6 g (1.8 mmol) of Compound 1 in 30 mL of methanol and 20 mL of acetic acid is added 10 mL of concentrated ammonium hydroxide. The mixture is stirred at room temperature for 2 days and the resulting solid is collected by filtration to give a crude product. The crude product is purified by silica gel column chromatography with chloroform as eluant to give 0.33 g (51%) of Compound 2 as a bluish green solid.

EXAMPLE 3

Preparation of difluoro-(5-methoxy-1-((5-methoxy-3-(2-(5-(4-methoxyphenyl))thienyl)-2-H-isoindol-1-yl)methylene)-3-(2-(5-(4-methoxyphenyl))thienyl)-1H-isoindolato-$N^1,N^2$)boron (Compound 3)

The following compound is prepared:

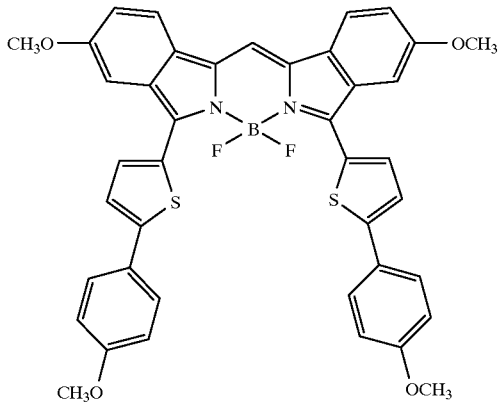

To a solution of 20 mg of Compound 2 in 20 mL of dichloromethane is added 500 μL of N,N-diisopropylethylamine, followed by the addition of 300 μL of $BF_3.Et_2O$. After the reaction mixture is stirred at room temperature for 8 hours, it is washed with two 20 mL portions of water. The organic layer is separated, dried over anhydrous $Na_2SO_4$ and concentrated under reduced pressure to give a crude product. It is purified by chromatography on silica gel with chloroform as eluant to give 12 mg (57%) of Compound 3 as a dark green solid. $^1H$ NMR (DMSO-$d_6$), δ3.83 (s, 6H, 2×$OCH_3$), 3.92 (s, 6H, 2×$OCH_3$), 7.07 (d, 4H, 4×ArH), 7.26 (d, 2H, 2×ArH), 7.46–7.52 (m, 2H, 2×ArH), 7.62–7.68 (m, 4H, 4×ArH), 7.78 (d, 4H, 4×ArH), 8.08 (d, 2H, 2×ArH), 8.39 (s, 1H, ArH).

EXAMPLE 4

Preparation of 4-methoxy-2-(2-(5-(2'-thienyl)) thienoyl)acetophenone (Compound 4)

The following compound is prepared:

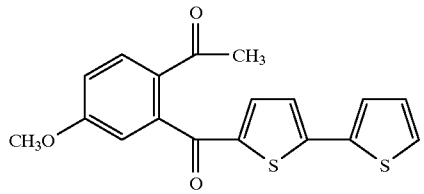

To a solution of 1.6 g (7.6 mmol) of 5-(2'-thienyl)-2-thienoic acid and 2.4 g (30 mmol) of pyridine in 100 mL of dry THF is added 4.1 g (19 mmol) of succinimidyl trifluoroacetate. After the mixture is stirred at room temperature for 12 hours, most of the THF is removed under reduced pressure. The resulting residue is dissolved in 100 mL of dichloromethane and washed with water (2×100 mL). The separated organic layer is dried over anhydrous $Na_2SO_4$ and concentrated under reduced pressure to give 1.8 g (90%) of the succinimidyl ester of 5-(2'-thienyl)-2-thienoic acid. A solution of 1.8 g (6.8 mmol) of the above succinimidyl ester in 20 mL of THF is added into a solution of 4.8 mL (154 mmol) of anhydrous hydrazine in 100 mL of THF while the mixture is stirred at 5° C. After the reaction mixture is stirred at 5° C. for 1 hour, the volume of THF is reduced to approximately 20 mL under reduced pressure. After addition of 100 mL of chloroform, it is washed with water (2×100 mL). The separated organic layer is dried over anhydrous $Na_2SO_4$ and concentrated to give 1.4 g (88%) of 5-(2'-thienyl)-2-thienoylhydrazine.

A solution of 1.4 g (6.0 mmol) of the above hydrazine and 2.5 g (15 mmol) of 4-methoxy-2-hydroxyacetophenone in 50 mL of 1-propanol is heated at reflux overnight. After cooling to room temperature, the resulting solid is collected by filtration, washed with 1-propanol and dried to give 0.7 g (30%) of N-(5-(2'-thienyl)-2-thienoyl)hydrazone of 4-methoxy-2-hydroxyacetophenone. To a suspension of 0.7 g (1.9 mmol) of the above hydrazone in 100 mL of THF is added 1.0 g (2.2 mmol) of lead tetracetate in small portions over a period of 10 minutes. After stirring at room temperature for 30 minutes, the resulting solid is removed by filtration. The filtrate is concentrated under reduced pressure and purified by silica gel chromatography using chloroform as eluant, giving 0.5 g (69%) of Compound.

EXAMPLE 5

Preparation of 5-methoxy-1-((5-methoxy-3-(2-(5,2'-bithienyl))-2H-isoindol-1-yl)methylene)-3-(2-(5,2'-bithienyl)))-1H-isoindole (Compound 5)

The following compound is prepared:

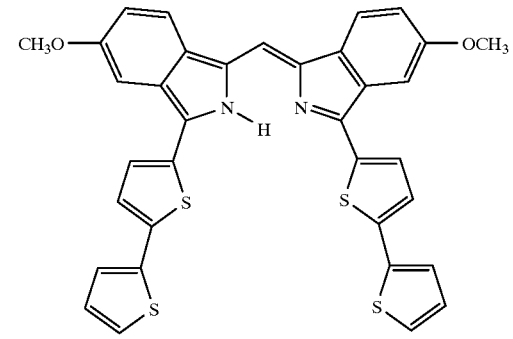

To a solution of 500 mg (1.5 mmol) of Compound 4 in 40 mL of methanol and 20 mL of acetic acid is added 12 mL of concentrated ammonium hydroxide. The mixture is stirred at room temperature for 48 hours and the resulting solid is collected by filtration to give a crude product. The crude product is further purified by silica gel column chromatography with chloroform as eluant to give 103 mg (23%) of Compound 5 as a bluish green solid.

EXAMPLE 6

Preparation of difluoro(5-methoxy-1-((5-methoxy-3-(2-(5,2'-bithienyl))-2H-isoinidol-1-yl)methylene)-3-(2-(5,2'-bithienyl))-1H-isoindolato-$N^1,N^2$)boron (Compound 6)

The following compound is prepared:

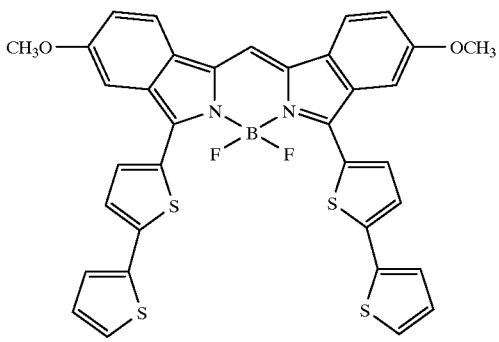

To a solution of 20 mg of Compound 5 in 20 mL of dichloromethane is added 400 μL of N,N-diisopropylethylamine, followed by the addition of 250 μL of $BF_3.Et_2O$. After the reaction mixture is stirred at room temperature for 6 hours, it is washed with two 20 mL portions of water. The organic layer is separated, dried over anhydrous $Na_2SO_4$ and concentrated under reduced pressure to give a crude product. It is purified by silica gel column chromatography with chloroform as eluant to give 10 mg (48%) of Compound 6 as a dark green solid. $^1$H NMR (DMSO-$d_6$), δ3.90 (s, 6H, 2×$CH_3$), 6.87 (s, 2H, 2×ArH), 7.17–7.21 (m, 2H, 2×ArH), 7.38–7.41 (m, 2H, 2×ArH), 7.43–7.45 (m, 2H, 2×ArH), 7.52–7.57 (m, 2H, 2×ArH), 7.63–7.66 (m, 2H, 2×ArH), 7.93–7.97 (m, 2H, 2×ArH), 8.11–8.15 (m, 2H, 2×ArH), 8.43 (s, 1H, ArCH=).

EXAMPLE 7

Preparation of (4-methoxy-2-(2-(5-(E,E)-1,3-(4-phenyl)butadien-1-yl))thienoyl)acetophenone (Compound 7)

The following compound is prepared:

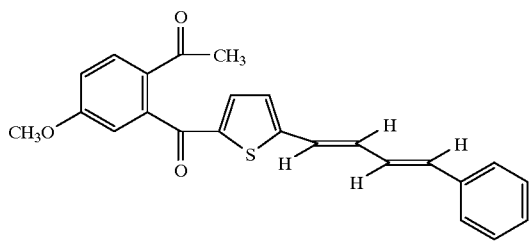

To a solution of 1.8 g (15.7 mmol) of 2-thiophenecarboxaldehyde and 6.1 g (14.7 mmol) of cinnamyl triphenylphosphonium chloride in 40 mL of anhydrous ethanol is added 50 mL of 0.2 M lithium ethoxide. After allowing this mixture to stir at room temperature for 4 hours, the resulting solid is collected by filtration, washed with ethanol and dried to give 1.5 g (50% yield) of 2-((E,E)-1,3-(4-phenyl)butadien-1-yl)thiophene.

To a solution of 1.2 (5.7 mmol) of the above thiophene derivative in 40 mL of dry THF is added a solution of phenyllithium (3.8 mL, 1.8 M solution in cylohexane:ether, 70:30) under $N_2$ atmosphere. The mixture is stirred at room temperature for 3 hours and then heated at reflux for 1 hour. After the reaction mixture is cooled to −78° C. with dry ice and acetone bath, dry $CO_2$ gas is bubbled through the reaction mixture for 4 hours. The reaction mixture is diluted with 150 mL of chloroform, washed with 0.1 M HCl solution (100 mL) and with water (2×150 mL). The separated organic layer is dried over anhydrous $Na_2SO_4$ and concentrated under reduced pressure to give 1.0 g (68%) of 5-((E,E)-1,3-(4-phenyl)butadien-1-yl)-2-thienoic acid.

To a solution of 1.0 g (3.9 mmol) of the above thienoic acid in 1 mL of dry DMF and 20 mL of toluene is added 0.6 mL (8.4 mmol) of thionyl chloride and the mixture is heated at 80° C. for 3 hours. After cooling to room temperature, the solvent and excess thionyl chloride are removed under reduced pressure. The resulting residue is dissolved in 40 mL of dry THF and 10 mL of dry dichloromethane and is added dropwise over a period of 30 minutes into a solution of 4.0 mL (128 mmol) of anhydrous hydrazine in 50 mL of dry THF while stirring at −10° C. After stirring at room temperature for 1 hour, 100 mL of water is added to the reaction mixture. The resulting precipitate is collected by filtration, washed with water and dried to give 0.43 g (42%) of 5-((E,E)-1,3-(4-phenyl)butadien-1-yl)-2-thienoylhydrazine.

A solution of 0.30 g (1.1 mmol) of the above hydrazine and 0.55 g (3.3 mmol) of 4-methoxy-2-hydroxyacetophenone in 30 mL of 1-propanol and 10 mL of DMSO is heated at 90° C. for 48 hours. After cooling to room temperature, the resulting solid is collected by filtration, washed with 1-propanol and dried to give 0.40 g (86%) of N-(5-(E,E)-1,3-(4-phenyl)butadien-1-yl)-2-thienoyl)hydrazone of 4-methoxy-2-hydroxyacetophenone.

To a suspension of 0.40 g (1.0 mmol) of the above hydrazone in 25 mL of THF is added 0.50 g (1.2 mmol) of lead tetracetate in small portions over a period of 5 minutes. After stirring at room temperature for 1 hour, the resulting solid is removed by filtration. The filtrate is concentrated under reduced pressure to give a crude product. It is purified by silica gel column chromatography using 20% ethyl acetate in hexane as eluant to give 0.26 g (59%) of Compound 7.

EXAMPLE 8

Labeling uniform polystyrene microspheres via dye-loading

To a stirred 100 mL suspension of carboxylate-modified, 2.0 μm polystyrene microspheres (Interfacial Dynamics Corp., Portland, Oreg.) that is 4.2% solids is added 50 mL methanol. A first dye solution is prepared that is 10–50 mg of the desired dye(s) in 5.5 mL dichloromethane and 17.5 mL ethanol. As vigorous stirring is continued, the dye solution is added to the microsphere suspension. The addition of the dye(s) is carried out by means of a syringe pump fitted with a TEFLON delivery tube and the dye solution is delivered at a low flow rate (~6 mL/hr). After the first dye addition is complete, the suspension is stirred for an additional 10 to 25 minutes. A second dye solution that is 5 to 25 mg of dye(s) in 20 mL of dichloromethane:ethanol (3:8, v/v) is added to the stirring microsphere suspension all at once. The suspension is allowed to stir for an additional 5 minutes.

The organic solvents are removed under reduced pressure at room temperature on a rotary evaporator. The aqueous suspension of dyed latex is then filtered through glass wool to remove any additional debris and dialyzed in E-pure water (25 mm tubing, molecular weight cutoff 12,000–14,000) to remove any residual dye. The dialysis is carried out until no more free dye is removed from the particles as detected by fluorimetric analysis of the dialysate. The fluorescent microsphere suspension is removed from dialysis and filtered again through glass wool to remove any remaining aggregates and other debris. The suspension is then sonicated in a bath sonicator for 5 minutes to ensure monodispersity.

Flow cytometry analysis of a dilute aqueous suspension of the product shows the final fluorescent microspheres possess near-equal emission intensity (intensity CV is less than 1%), and are highly monodisperse (more than 98% of singlets).

EXAMPLE 9

Preparation of a labeled microparticle by copolymerization

Compound 8

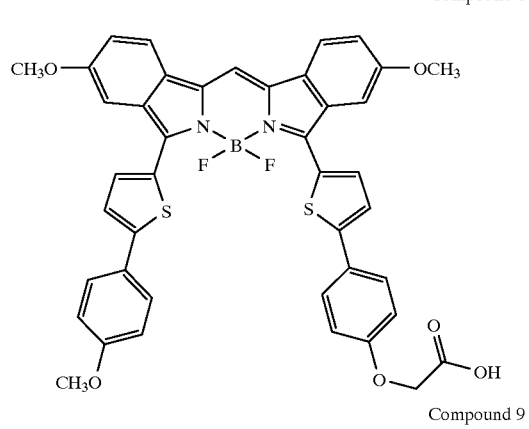

Compound 9

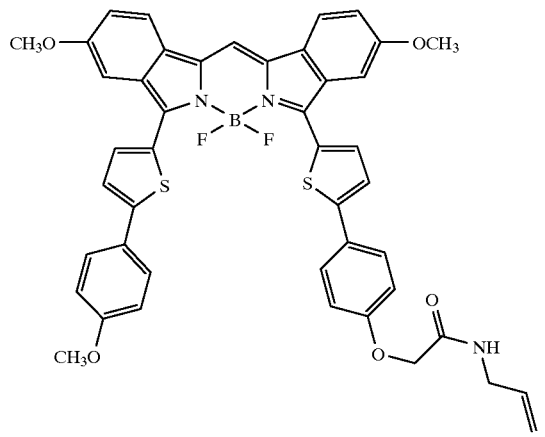

Utilizing methods well known in the art, the unsymmetrical dye Compound 8 is prepared, and the resulting acid is converted to a succinimidyl ester by dissolving the acid in methylene chloride and stirring overnight with 1.2 equivalents of N,N'-disuccinimidylcarbonate. Addition of water, separation of the organic layer and drying and evaporating results in the isolation of the desired intermediate product. The resulting activated ester is converted to the amide, Compound 9 by stirring for 2 hours with excess allylamine in methylene chloride. Isolation by the usual addition of water, separation of the organic phase, drying and evaporation gives the desired product. Compound 9 is copolymerized with methacrylamide according to the method of Rembaum (U.S. Pat. No. 4,326,008, supra) to give the fluorescent microparticle.

EXAMPLE 10

Preparation of 4-methoxy-2-(2-(5-(4-vinylphenyl)thienoyl))acetophenone (Compound 10)

The following compound is prepared:

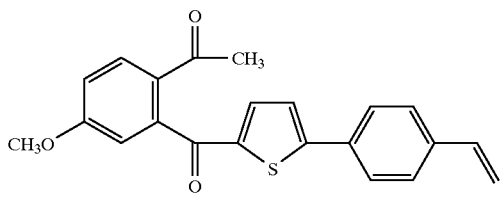

The compound is prepared analogously to that of Example 1, except using 5-(4-vinylphenyl)-2-thienoic acid instead of 5-(4-methoxyphenyl)-2-thienoic acid.

EXAMPLE 11

Preparation of 5-methoxy-1-((5-methoxy-3-(2-(5-(4-methoxyphenyl))thienyl)-2H-isoindol-1-yl)methylene)-3-(2-(5-(4-vinylphenyl)thienyl))-1H-isoindole (Compound 11)

The following compound is prepared:

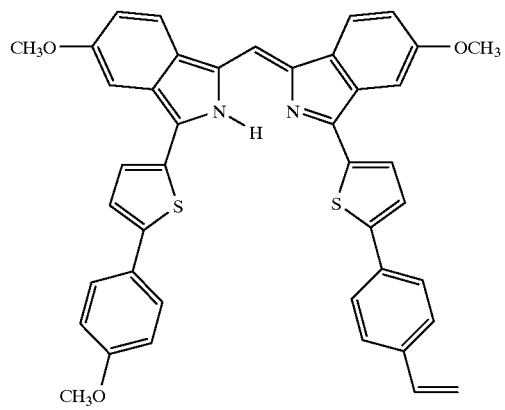

To a solution of Compound 1 and Compound 10 in methanol and acetic acid is added concentrated ammonium hydroxide as in Example 2. The mixture of symmetrical and unsymmetrical products is separated by preparative HPLC to give Compound 11.

EXAMPLE 12

Preparation of difluoro(5-methoxy-1-((5-methoxy-3-(2-(5-(4-methoxylphenyl))thienyl)-2H-isoindol-1-yl)methylene)-3-(2-(5-(4-vinylphenyl))thienyl)-1H-isoindolato-$N^1,N^2$)boron (Compound 12)

The following compound is prepared:

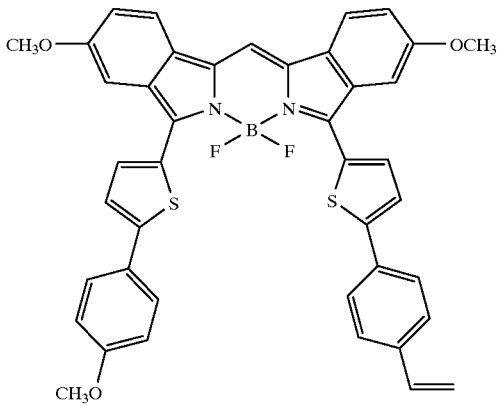

Exactly analogously to the procedure described in Example 3, Compound 12 is obtained by treating Compound 11 (Example 11) with $BF_3 \cdot Et_2O$.

The resulting vinyl dye is converted to a copolymer with styrene in a manner analogous to that described in Example 9.

EXAMPLE 13

Preparation of small, uniform fluorescent microspheres

A mixture of 1.5 g of Compound 3, 300 g of styrene, 2 g of sodium dodecyl sulfate and 10 g of hexadecane in 1000 mL water is treated with potassium persulfate as described by Ugelstad et al. (ADV. COLLOID & INTERFACE SCIENCE 13, 101 (1980)) to give small uniform fluorescent latex particles.

EXAMPLE 14

Preparation of uniform fluorescent microspheres

Following the two-step swelling method described in Ugelstad et al., 3 g of small particles prepared using Example 13 in 1000 mL water are treated with a mixture of 1 g of Compound 3, 300 g of styrene and 3 g of sodium dodecyl sulfate in water until maximum swelling of the particles has occurred. Polymerization is again initiated with potassium persulfate to give monodisperse particles of approximately 8 µm size. Shorter swelling time with less styrene gives smaller monodisperse particles.

It is to be understood that, while the foregoing invention has been described in detail by way of illustration and example, numerous modifications, substitutions, and alterations are possible without departing from the spirit and scope of the invention as described in the following claims.

What is claimed is:
1. A compound of the formula:

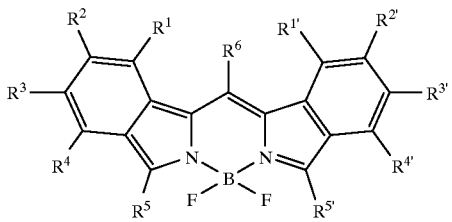

wherein
$R^5$ and $R^{5'}$ are bathochromic substituents independently having the formula -α-K-β;
wherein
K is a single covalent bond, or K is an ethenyl, butadienyl, or hexatrienyl moiety;
α is a phenyl a naphthyl, a thienyl, a furyl, a pyrrolyl or a pyridyl and is optionally and independently substituted by H, halogen, cyano, sulfo, alkali or ammonium salt of sulfo, carboxy, alkali or ammonium salt of carboxy, nitro, alkyl, perfluoroalkyl, alkoxy, alkylthio, amino, monoalkylamino, dialkylamino; alkylamido or a polymerizable moiety;
β is a phenyl, a naphthyl, a thienyl, a furyl, a pyrrolyl or a pyridyl that is optionally and independently substituted by H, halogen, cyano, sulfo, alkali or ammonium salt of sulfo, carboxy, alkali or ammonium salt of carboxy, nitro, alkyl, perfluoroalkyl, alkoxy, alkylthio, amino, monoalkylamino, dialkylamino; alkylamido or a polymerizable moiety, that is optionally further substituted by an -L-γ;
wherein each L is independently a single covalent bond or an ethenyl, butadienyl, or hexatrienyl moiety;
γ is a phenyl, a naphthyl, a thienyl, a furyl, a pyrrolyl or a pyridyl that is optionally and independently substituted by H, halogen, cyano, sulfo, alkali or ammonium salt of sulfo, carboxy, alkali or ammonium salt of carboxy, nitro, alkyl, perfluoroalkyl, alkoxy, alkylthio, amino, monoalkylamino, dialkylamino; alkylamido or a polymerizable moiety;
provided that at least one α, β or γ is a thienyl, a furyl, a pyrrolyl or a pyridyl;
$R^1, R^2, R^3, R^4, R^{1'}, R^{2'}, R^{3'}$, and $R^{4'}$ are independently H, halogen, cyano, sulfo, alkali or ammonium salts of sulfo, carboxy, alkali or ammonium salt of carboxy, alkyl, perfluoroalkyl, alkoxy, alkoxycarbonyl, acyloxy, alkylthio, nitro, amino, monoalkylamino, dialkylamino, alkylamido, -J-ARYL, -J-HETEROARYL, or a polymerizable moiety; or two adjacent substituents are fused to form a BENZO or a HETERO;
wherein
each J is independently a single covalent bond, —O—, —NH—, —(C=O)—NH—, —NH—(C=O)—; or J is an ethenyl, butadienyl, or hexatrienyl moiety;
each ARYL is independently an aromatic or polyaromatic substituent containing 1 to 4 aromatic rings and no heteroatoms, and is optionally and independently substituted by H, halogen, cyano, sulfo, alkali or ammonium salt of sulfo, carboxy, alkali or ammonium salt of carboxy, nitro, alkyl, perfluoroalkyl, alkoxy, alkylthio, amino, monoalkylamino, dialkylamino; alkylamido or a polymerizable moiety;

each HETEROARYL is independently a 5- or 6-membered aromatic heterocycle that is optionally fused to an additional six-membered aromatic ring, or is fused to one 5- or 6-membered heteroaromatic ring, said heteroaromatic rings contain at least 1 and as many as 3 heteroatoms that are selected from the group consisting of O, N or S in any combination, and is optionally and independently substituted by H, halogen, cyano, sulfo, alkali or ammonium salt of sulfo, carboxy, alkali or ammonium salt of carboxy, alkyl, perfluoroalkyl, alkoxy, alkylthio, amino, monoalkylamino, dialkylamino, alkylamido, or a polymerizable moiety;

each BENZO is independently —$CR^7$=$CR^8$—$CR^9$=$CR^{10}$— bonded to any two adjacent positions of $R^1$, $R^2$, $R^3$, $R^4$, $R^{1'}$, $R^{2'}$, $R^{3'}$, and $R^{4'}$, up to a maximum of four BENZO moieties;

wherein $R^7$, $R^8$, $R^9$ and $R^{10}$ are independently selected from H, halogen, cyano, sulfo, alkali or ammonium salts of sulfo, carboxy, alkali or ammonium salt of carboxy, alkyl, perfluoroalkyl, alkoxy, alkylthio, nitro, amino, monoalkylamino, dialkylamino, alkylamido, or a polymerizable moiety;

each HETERO is independently a combination of 1 to 3 carbon atoms and 1 to 3 hetero atoms selected from the group consisting of O, S and N to form a fused 5- or 6-membered heteroaromatic ring that is bonded to any two adjacent positions of $R^1$, $R^2$, $R^3$, $R^4$, $R^{1'}$, $R^{2'}$, $R^{3'}$, and $R^{4'}$, and is optionally and independently substituted by H, halogen, cyano, sulfo, alkali or ammonium salt of sulfo, carboxy, alkali or ammonium salt of carboxy, alkyl, perfluoroalkyl, alkoxy, alkylthio, amino, monoalkylamino, dialkylamino, alkylamido, or a polymerizable moiety;

$R^6$ is H, alkyl, cycloalkyl having 3–6 carbons, perfluoroalkyl, an ARYL, a HETEROARYL, or CN;

wherein the alkyl portions of all alkyl, perfluoroalkyl, alkoxy, alkylthio, monoalkylamino, dialkylamino and alkylamido groups independently have 1–18 carbon atoms in an arrangement that is either linear or branched, saturated or unsaturated; and the alkyl portions of all alkyl, perfluoroalkyl, alkoxy, alkylthio, monoalkylamino, dialkylamino and alkylamido groups are independently and optionally further substituted by H, halogen, cyano, amino, hydroxy, carboxy, alkali or ammonium salt of carboxy, mercapto, sulfo, alkali or ammonium salt of sulfo, or a polymerizable moiety.

2. A compound, as claimed in claim 1, wherein $R^1$, $R^2$, $R^3$, $R^4$, $R^{1'}$, $R^{2'}$, $R^{3'}$, and $R^{4'}$ are independently H, halogen, cyano, alkyl, perfluoroalkyl, alkoxy, alkylthio, -J-ARYL, -J-HETEROARYL, or two adjacent substituents are fused to form a BENZO or a HETERO;

wherein each α, β, and γ is optionally and independently substituted by H, halogen, cyano, alkyl, perfluoroalkyl, alkoxy, or alkylthio;

each ARYL is independently an aromatic or polyaromatic substituent containing 1 to 4 aromatic rings and no heteroatoms, and is optionally and independently substituted by H, halogen, cyano, alkyl, perfluoroalkyl, alkoxy, or alkylthio;

each HETEROARYL is independently a 5- or 6-membered aromatic heterocycle that is optionally fused to additional six-membered aromatic rings, or is fused to one 5- or 6-membered heteroaromatic ring, said heteroaromatic rings contain at least 1 and as many as 3 heteroatoms that are selected from the group consisting of O, N or S in any combination, and is optionally and independently substituted by H, halogen, cyano, alkyl, perfluoroalkyl, alkoxy, or alkylthio;

each BENZO is independently —$CR^7$=$CR^8$—$CR^9$=$CR^{10}$— bonded to any two adjacent positions of $R^1$, $R^2$, $R^3$, $R^4$, $R^{1'}$, $R^{2'}$, $R^{3'}$, and $R^{4'}$, up to a maximum of four BENZO moieties;

wherein $R^7$, $R^8$, $R^9$ and $R^{10}$ are independently selected from H, halogen, cyano, alkyl, perfluoroalkyl, alkoxy, or alkylthio;

each HETERO is independently a combination of 1 to 3 carbon atoms and 1 to 3 hetero atoms selected from the group consisting of O, S and N to form a fused 5- or 6-membered heteroaromatic ring that is bonded to any two adjacent positions of $R^1$, $R^2$, $R^3$, $R^4$, $R^{1'}$, $R^{2'}$, $R^{3'}$, and $R^{4'}$, and that is optionally and independently substituted by H, halogen, cyano, alkyl, perfluoroalkyl, alkoxy, or alkylthio.

3. A compound, as claimed in claim 2, wherein at $R^1$=$R^{1'}$, $R^2$=$R^{2'}$, $R^3$=$R^{3'}$, $R^4$=$R^{4'}$ and $R^5$=$R^{5'}$.

4. A compound, as claimed in claim 2, wherein α, β, and γ are independently a phenyl, a thienyl, a furyl, or a pyrrolyl.

5. A compound, as claimed in claim 2, wherein

α is a thienyl;

β is a para-alkoxyphenyl or a thienyl;

γ is a para-alkoxyphenyl or a thienyl; and

K and L are independently a single covalent bond or ethenyl.

6. A compound, as claimed in claim 5, wherein $R^3$ and $R^{3'}$ are each alkoxy.

7. A composition, comprising:

a compound of the formula:

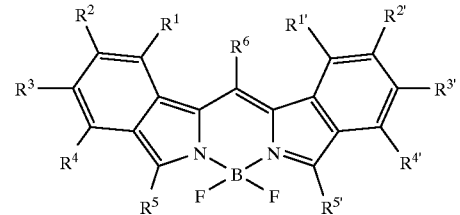

wherein $R^5$ and $R^{5'}$ are bathochromic substituents independently having the formula -α-K-β;

wherein

K is a single covalent bond, or K is an ethenyl, butadienyl, or hexatrienyl moiety; and α is a phenyl, a naphthyl, a thienyl, a furyl, a pyrrolyl or a pyridyl that is optionally and independently substituted by H, halogen, cyano, alkyl, perfluoroalkyl, alkoxy, or alkylthio;

β is a phenyl, a naphthyl, a thienyl, a furyl, a pyrrolyl or a pyridyl that is optionally and independently substituted by H, halogen, cyano, alkyl, perfluoroalkyl, alkoxy, or alkylthio, that is optionally further substituted by an -L-γ;

wherein L is a single covalent bond, or L is an ethenyl, butadienyl, or hexatrienyl moiety; and γ is a phenyl, a naphthyl, a thienyl, a furyl, a pyrrolyl or a pyridyl that is optionally substituted by H, halogen, cyano, alkyl, perfluoroalkyl, alkoxy, or alkylthio;

provided that at least one α, β or γ is a thienyl, a furyl, a pyrrolyl or a pyridyl;

$R^1$, $R^2$, $R^3$, $R^4$, $R^{1'}$, $R^{2'}$, $R^{3'}$, and $R^{4'}$ are independently H, halogen, cyano, alkyl, perfluoroalkyl, alkoxy, alkylthio, -J-ARYL, -J-HETEROARYL, or two adjacent substituents are fused to form a BENZO or a HETERO;

wherein

J is a single covalent bond, —O—, —NH—, —(C=O)—NH—, —NH—(C=O)—; or J is an ethenyl, butadienyl, or hexatrienyl moiety;

each ARYL is independently an aromatic or polyaromatic substituent containing 1 to 4 aromatic rings and no heteroatoms, and is optionally and independently substituted by H, halogen, cyano, alkyl, perfluoroalkyl, alkoxy, or alkylthio;

each HETEROARYL is independently a 5- or 6-membered aromatic heterocycle that is optionally fused to additional six-membered aromatic rings, or is fused to one 5- or 6-membered heteroaromatic ring, the heteroaromatic rings contain at least 1 and as many as 3 heteroatoms that are selected from the group consisting of O, N, or S in any combination, and is optionally and independently substituted by H, halogen, cyano, alkyl, perfluoroalkyl, alkoxy, or alkylthio;

each BENZO is independently —$CR^7$=$CR^8$—$CR^9$=$CR^{10}$— bonded to any two adjacent positions of $R^1$, $R^2$, $R^3$, $R^4$, $R^{1'}$, $R^{2'}$, $R^{3'}$, and $R^{4'}$, up to a maximum of four BENZO moieties;

wherein $R^7$, $R^8$, $R^9$ and $R^{10}$ are independently selected from H, halogen, cyano, alkyl, perfluoroalkyl, alkoxy, or alkylthio;

each HETERO is independently a combination of 1 to 3 carbon atoms and 1 to 3 hetero atoms selected from the group consisting of O, S and N to form a fused 5- or 6-membered heteroaromatic ring that is bonded to any two adjacent positions of $R^1$, $R^2$, $R^3$, $R^4$, $R^{1'}$, $R^{2'}$, $R^{3'}$, and $R^{4'}$, and that is optionally and independently substituted by H, halogen, cyano, alkyl, perfluoroalkyl, alkoxy, or alkylthio;

$R^6$ is H, alkyl, cycloalkyl having 3–6 carbons, perfluoroalkyl, an ARYL, a HETEROARYL, or CN;

wherein the alkyl portions of all alkyl, perfluoroalkyl, alkoxy, alkylthio, monoalkylamino, dialkylamino and alkylamido groups independently have 1–18 carbon atoms in an arrangement that is either linear or branched; and the alkyl portions of all alkyl, perfluoroalkyl, alkoxy, alkylthio, monoalkylamino, dialkylamino and alkylamido groups are independently and optionally further substituted by H, halogen, or cyano incorporated covalently or noncovalently within a polymeric matrix.

8. A composition, as claimed in claim 7, wherein the compound is incorporated noncovalently within the polymeric matrix.

9. A composition, as claimed in claim 7, wherein for the compound $R^1$=$R^{1'}$, $R^2$=$R^{2'}$, $R^3$=$R^{3'}$, $R^4$=$R^{4'}$ and $R^5$=$R^{5'}$.

10. A composition, as claimed in claim 7, wherein the polymeric matrix comprises a polymer or copolymer of a styrene, a divinyl benzene, an acrylate or methacrylate ester, an acrylic acid or methacrylic acid, an acrylamide or methacrylamino, an acrylonitrile or methacrylonitrile, a vinyl halide, a vinylidene halide, a vinylidene ester, a vinylidene ether, an alkene, an epoxide or a urethane.

11. A composition, as claimed in claim 10, wherein the polymeric matrix comprises a polymer or copolymer of polystyrene that is optionally crosslinked through the incorporation of divinylbenzene during polymerization.

12. A composition, as claimed in claim 11, wherein for the compound $R^1$=$R^{1'}$, $R^2$=$R^{2'}$, $R^3$=$R^{3'}$, $R^4$=$R^{4'}$ and $R^5$=$R^{5'}$.

13. A composition, as claimed in claim 7, wherein the polymeric matrix is a microsphere having a diameter of about 0.01 μm to about 100 μm.

14. A composition, as claimed in claim 13, wherein the microsphere has a diameter of about 1 μm to about 25 μm.

15. a composition, as claimed in claim 13, wherein the microsphere is surface modified with a member of a specific binding pair.

16. A composition, as claimed in claim 12, wherein for the compound

α is a thienyl;

β is a para-alkoxyphenyl or a thienyl;

γ is a para-alkoxyphenyl or a thienyl; and

K and L are independently a single covalent bond or an ethenyl moiety.

17. A composition, as claimed in claim 7, wherein the polymeric matrix is biodegradeable.

18. A method of tracing transport within a sample, comprising:

a) adding to the sample a composition comprising a dye compound of the formula

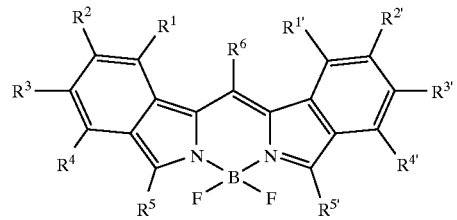

wherein $R^5$ and $R^{5'}$ are bathochromic substituents independently having the formula -α-K-β;

wherein

K is a single covalent bond, or K is an ethenyl, butadienyl, or hexatrienyl moiety;

α is a phenyl, a naphthyl, a thienyl, a furyl, a pyrrolyl or a pyridyl and is optionally and independently substituted by H, halogen, cyano, sulfo, alkali or ammonium salt of sulfo, carboxy, alkali or ammonium salt of carboxy, nitro, alkyl, perfluoroalkyl, alkoxy, alkylthio, amino, monoalkylamino, dialkylamino; alkylamido or a polymerizable moiety;

β is a phenyl, a naphthyl, a thienyl, a furyl, a pyrrolyl or a pyridyl that is optionally and independently substituted by H, halogen, cyano, sulfo, alkali or ammonium salt of sulfo, carboxy, alkali or ammonium salt of carboxy, nitro, alkyl, perfluoroalkyl, alkoxy, alkylthio, amino, monoalkylamino, dialkylamino; alkylamido or a polymerizable moiety, that is optionally further substituted by an -L-γ;

wherein each L is independently a single covalent bond an ethenyl, butadienyl, or hexatrienyl moiety;

γ is a phenyl, a naphthyl, a thienyl, a furyl, a pyrrolyl or a pyridyl that is optionally and independently substituted by H, halogen, cyano, sulfo, alkali or ammonium salt of sulfo, carboxy, alkali or ammonium salt of carboxy, nitro, alkyl, perfluoroalkyl, alkoxy, alkylthio, amino, monoalkylamino, dialkylamino; alkylamido or a polymerizable moiety;

provided that at least one α, β or γ is a thienyl, a furyl, a pyrrolyl or a pyridyl;

$R^1$, $R^2$, $R^3$, $R^4$, $R^{1'}$, $R^{2'}$, $R^{3'}$, and $R^{4'}$ are independently H, halogen, cyano, sulfo alkali or ammonium salts of sulfo, carboxy, alkali or ammonium salt of carboxy, alkyl, perfluoroalkyl, alkoxy, alkoxycarbonyl, acyloxy, alkylthio, nitro, amino, monoalkylamino, dialkylamino, alkylamido, -J-ARYL, -J-HETEROARYL, or a polymerizable moiety; or two adjacent substituents are fused to form a BENZO or a HETERO;

wherein each J is independently a single covalent bond, —O—, —NH—, —(C=O)—NH—, —NH—(C=O)—; or J is an ethenyl, butadienyl, or hexatrienyl moiety;

each ARYL is independently an aromatic or polyaromatic substituent containing 1 to 4 aromatic rings and no heteroatoms, and is optionally and independently substituted by H, halogen, cyano, sulfo, alkali or ammonium salt of sulfo, carboxy, alkali or ammonium salt of carboxy, nitro, alkyl, perfluoroalkyl, alkoxy, alkylthio, amino, monoalkylamino, dialkylamino; alkylamido or a polymerizable moiety;

each HETEROARYL is independently a 5- or 6-membered aromatic heterocycle that is optionally fused to an additional six-membered aromatic ring, or is fused to one 5- or 6-membered heteroaromatic ring, said heteroaromatic rings contain at least 1 and as many as 3 heteroatoms that are selected from the group consisting of O, N or S in any combination, and is optionally and independently substituted by H, halogen, cyano, sulfo, alkali or ammonium salt of sulfo, carboxy, alkali or ammonium salt of carboxy, alkyl, perfluoroalkyl, alkoxy, alkylthio, amino, monoalkylamino, dialkylamino, alkylamido, or a polymerizable moiety;

each BENZO is independently —$CR^7$=$CR^8$—$CR^9$=$CR^{10}$— bonded to any two adjacent positions of $R^1$, $R^2$, $R^3$, $R^4$, $R^{1'}$, $R^{2'}$, $R^{3'}$, and $R^{4'}$, up to a maximum of four BENZO moieties;

wherein $R^7$, $R^8$, $R^9$ and $R^{10}$ are independently selected from H, halogen, cyano, sulfo, alkali or ammonium salts of sulfo, carboxy, alkali or ammonium salt of carboxy, alkyl, perfluoroalkyl, alkoxy, alkylthio, nitro, amino, monoalkylamino, dialkylamino, alkylamido, or a polymerizable moiety;

each HETERO is independently a combination of 1 to 3 carbon atoms and 1 to 3 hetero atoms selected from the group consisting of O, S and N to form a fused 5- or 6-membered heteroaromatic ring that is bonded to any two adjacent positions of $R^1$, $R^2$, $R^3$, $R^4$, $R^{1'}$, $R^{2'}$, $R^{3'}$, and $R^{4'}$, and that is optionally and independently substituted by H, halogen, cyano, sulfo, alkali or ammonium salt of sulfo, carboxy, alkali or ammonium salt of carboxy, alkyl, perfluoroalkyl, alkoxy, alkylthio, amino, monoalkylamino, dialkylamino, alkylamido, or a polymerizable moiety;

$R^6$ is H, alkyl, cycloalkyl having 3–6 carbons, perfluoroalkyl, an ARYL, a HETEROARYL, or CN;

wherein the alkyl portions of all alkyl, perfluoroalkyl, alkoxy, alkylthio, monoalkylamino, dialkylamino and alkylamido groups independently have 1–18 carbon atoms in an arrangement that is either linear or branched, saturated or unsaturated; and the alkyl portions of all alkyl, perfluoroalkyl, alkoxy, alkylthio, monoalkylamino, dialkylamino and alkylamido groups are independently and optionally further substituted by H, halogen, cyano, amino, hydroxy, carboxy, alkali or ammonium salt of carboxy, mercapto, sulfo, alkali or ammonium salt of sulfo, or a polymerizable moiety; and b) generating a fluorescence response from the dye compound to indicate transport within the sample.

19. A method, as claimed in claim 18, wherein the composition comprises a polymeric matrix that incorporates, either covalently or noncovalently, a dye compound of the formula:

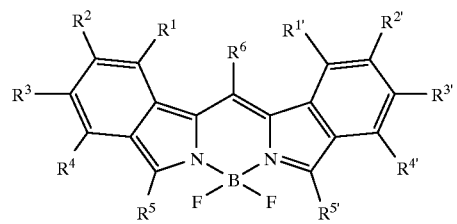

wherein $R^5$ and $R^{5'}$ are bathochromic substituents independently having the formula -α-K-β;

wherein

K is a single covalent bond, or K is an ethenyl, butadienyl, or hexatrienyl moiety; and α is a phenyl, a naphthyl, a thienyl, a furyl, a pyrrolyl or a pyridyl that is optionally and independently substituted by H, halogen, cyano, alkyl, perfluoroalkyl, alkoxy, or alkylthio;

β is a phenyl, a naphthyl, a thienyl, a furyl, a pyrrolyl or a pyridyl that is optionally and independently substituted by H, halogen, cyano, alkyl, perfluoroalkyl, alkoxy, or alkylthio, that is optionally further substituted by an -L-γ;

wherein L is a single covalent bond, or L is an ethenyl, butadienyl, or hexatrienyl moiety; and γ is a phenyl, a naphthyl, a thienyl, a furyl, a pyrrolyl or a pyridyl that is optionally and independently substituted by H, halogen, cyano, alkyl, perfluoroalkyl, alkoxy, or alkylthio;

provided that at least one α, β or γ is a thienyl, a furyl, a pyrrolyl or a pyridyl;

$R^1$, $R^2$, $R^3$, $R^4$, $R^{1'}$, $R^{2'}$, $R^{3'}$, and $R^{4'}$ are independently H, halogen, cyano, alkyl, perflouroalkyl, alkoxy, alkylthio, -J-ARYL, -J-HETEROARYL, or two adjacent substituents are fused to form a BENZO or a HETERO;

wherein

J is a single covalent bond, —O—, —NH—, —(C=O)—NH—, —NH—(C=O)—; or J is an ethenyl, butadienyl, or hexatrienyl moiety;

each ARYL is independently an aromatic or polyaromatic substituent containing 1 to 4 aromatic rings and no heteroatoms, and is optionally and independently substituted by H, halogen, cyano, alkyl, perfluoroalkyl, alkoxy, or alkylthio;

each HETEROARYL is independently a 5-or 6-membered aromatic heterocycle that is optionally fused to additional six-membered aromatic rings, or is fused to one 5- or 6-membered heteroaromatic ring, the heteroaromatic rings contain at least 1 and as many as 3 heteroatoms that are selected from the group consisting of O, N or S in any combination, and is optionally and independently substituted by H, halogen, cyano, alkyl, perfluoroalkyl, alkoxy, or alkylthio;

each BENZO is independently —$CR^7$=$CR^8$—$CR^9$=$CR^{10}$— bonded to any two adjacent positions of $R^1$, $R^2$, $R^3$, $R^4$, $R^{1'}$, $R^{2'}$, $R^{3'}$, and $R^{4'}$, up to a maximum of four BENZO moieties;

wherein $R^7$, $R^8$, $R^9$ and $R^{10}$ are independently selected from H, halogen, cyano, alkyl, perfluoroalkyl, alkoxy, or alkylthio;

each HETERO is independently a combination of 1 to 3 carbon atoms and 1 to 3 hetero atoms selected from the group consisting of O, S and N to form a fused 5- or 6-membered heteroaromatic ring that is bonded to any two adjacent positions of $R^1$, $R^2$, $R^3$, $R^4$, $R^{1'}$, $R^{2'}$, $R^{3'}$, and $R^{4'}$, and that is optionally and independently substituted by H, halogen, cyano, alkyl, perfluoroalkyl, alkoxy, or alkylthio;

$R^6$ is H, alkyl, cycloalkyl having 3–6 carbons, perfluoroalkyl, an ARYL, a HETEROARYL, or CN;

wherein the alkyl portions of all alkyl, perfluoroalkyl, alkoxy, alkylthio, monoalkylamino, dialkylamino and alkylamido groups independently have 1–18 carbon atoms in an arrangement that is either linear or branched; and the alkyl portions of all alkyl, perfluoroalkyl, alkoxy, alkylthio, monoalkylamino, dialkylamino and alkylamido groups are independently and optionally further substituted by H, halogen, or cyano.

20. A method, as claimed in claim 19, wherein the dye compound is incorporated noncovalently within the polymeric matrix; and the polymeric matrix is a microsphere having a diameter of about 0.01 μm to about 100 μm.

21. A method, as claimed in claim 20, wherein
$R^1$, $R^2$, $R^3$, $R^4$, $R^{1'}$, $R^{2'}$, $R^{3'}$, and $R^{4'}$ are independently H, halogen, cyano, alkyl, perfluoroalkyl, alkoxy, alkylthio, -J-ARYL, -J-HETEROARYL, or two adjacent substituents are fused to form a BENZO or a HETERO;
$R^1=R^{1'}$, $R^2=R^{2'}$, $R^3=R^{3'}$, $R^4=R^{4'}$ and $R^5=R^{5'}$; and
the step of generating a fluorescence response comprises illuminating the dye compound at a wavelength longer than 700 nm.

22. A method, as claimed in claim 20, wherein the step of generating a fluorescence response is performed using a microscope, a fluorometer, or a flow cytometer.

23. A method, as claimed in claim 20, wherein the polymeric matrix is a microsphere having a diameter of about 1 μm to about 25 μm.

24. A method, as claimed in claim 19, wherein the polymeric matrix comprises a polymer or copolymer of a styrene, a divinyl benzene, an acrylate or methacrylate ester, an acrylic acid or methacrylic acid, an acrylamide or methacrylamino, an acrylonitrile or methacrylonitrile, a vinyl halide, a vinylidene halide, a vinylidene ester, a vinylidene ether, an alkene, an epoxide or a urethane.

25. A method, as claimed in claim 24, wherein the polymeric matrix comprises a polymer or copolymer of polystyrene that is optionally crosslinked through the incorporation of divinylbenzene during polymerization.

26. A method, as claimed in claim 20, wherein the sample is a biological sample that comprises a circulatory or respiratory system.

27. A method, as claimed in claim 26, wherein the sample comprises a circulatory system, and transport occurs due to movement of fluid within the circulatory system.

28. A method, as claimed in claim 26, wherein sample comprises a respiratory system, and transport occurs due to movement of gas within the respiratory system.

29. A method, as claimed in claim 26, wherein the resultant distribution of the fluorescence response indicates the circulatory or respiratory system volume.

30. A method, as claimed in claim 26, wherein the resultant distribution of the fluorescence response indicates the circulatory or respiratory system flow characteristics.

31. A method, as claimed in claim 26, wherein the sample is an organ, a tissue or an animal.

32. A method, as claimed in claim 27, wherein the sample is an animal.

33. A method, as claimed in claim 27, wherein said microsphere has a diameter of from 0.1 to 40 micrometers, and the compound is added to the sample as an aqueous suspension.

34. A method, as claimed in claim 27, wherein the sample is an animal having a circulatory system, and the resultant distribution of the fluorescence response indicates blood flow in the animal.

35. A method, as claimed in claim 27, wherein the microsphere is surface modified with a member of a specific binding pair, and the resultant distribution of the fluorescence response indicates the location of a binding pair member complementary to the member of a specific binding pair.

36. A method, as claimed in claim 28, wherein said microsphere has a diameter of from 0.1 to 5 micrometers, and the compound is added to the sample as an aerosol.

37. A method, as claimed in claim 28, wherein the sample is an animal having a respiratory system, and the resultant distribution of the fluorescence response indicates regional ventilation in the animal.

38. A compound, having the formula

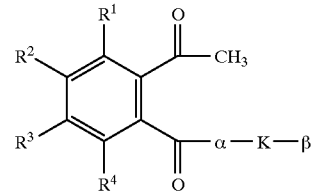

wherein
$R^1$, $R^2$, $R^3$, and $R^4$ are independently H, halogen, cyano, sulfo, alkali or ammonium salts of sulfo, carboxy, alkali or ammonium salt of carboxy, alkyl, perfluoroalkyl, alkoxy, alkoxycarbonyl, acyloxy, alkylthio, nitro, amino, monoalkylamino, dialkylamino, alkylamido, -J-ARYL, -J-HETEROARYL, or a polymerizable moiety; or two adjacent substituents are fused to form a BENZO or a HETERO;

wherein
J is a single covalent bond, —O—, —NH—, —(C=O)—NH—, —NH—(C=O)—; or J is an ethenyl, butadienyl, or hexatrienyl moiety;
K is a single covalent bond, or K is an ethenyl, butadienyl, or hexatrienyl moiety; and
α is a phenyl, a naphthyl, a thienyl, a furyl, a pyrrolyl or a pyridyl that is optionally and independently substituted by H, halogen, cyano, sulfo, alkali or ammonium salt of sulfo, carboxy, alkali or ammonium salt of carboxy, nitro, alkyl, perfluoroalkyl, alkoxy, alkylthio, amino, monoalkylamino, dialkylamino; alkylamido or a polymerizable moiety;
β is a phenyl, a naphthyl, a thienyl, a furyl, a pyrrolyl or a pyridyl that is optionally and independently substituted by H, halogen, cyano, sulfo, alkali or ammonium salt of sulfo, carboxy, alkali or ammonium salt of carboxy, nitro, alkyl, perfluoroalkyl, alkoxy, alkylthio, amino, monoalkylamino, dialkylamino; alkylamido or a polymerizable moiety, that is optionally further substituted by an -L-γ;

wherein each L is a single covalent bond or an ethenyl, butadienyl, or hexatrienyl moiety;

γ is a phenyl, a naphthyl, a thienyl, a furyl, a pyrrolyl or a pyridyl that is optionally and independently substituted by H, halogen, cyano, sulfo, alkali or ammonium salt of sulfo, carboxy, alkali or ammonium salt of carboxy, nitro, alkyl, perfluoroalkyl, alkoxy, alkylthio, amino, monoalkylamino, dialkylamino; alkylamido or a polymerizable moiety;

provided that at least one α, β or γ is a thienyl, a furyl, a pyrrolyl or a pyridyl;

each ARYL is independently an aromatic or polyaromatic substituent containing 1 to 4 aromatic rings and no heteroatoms, and is optionally and independently substituted by H, halogen, cyano, sulfo, alkali or ammonium salt of sulfo, carboxy, alkali or ammonium salt of carboxy, nitro, alkyl, perfluoroalkyl, alkoxy, alkylthio, amino, monoalkylamino, dialkylamino; alkylamido or a polymerizable moiety;

each HETEROARYL is independently a 5- or 6-membered aromatic heterocycle that is optionally fused to additional six-membered aromatic rings, or is fused to one 5- or 6-membered heteroaromatic ring, said heteroaromatic rings contain at least 1 and as many as 3 heteroatoms that are selected from the group consisting of O, N or S in any combination, and is optionally and independently substituted by H, halogen, cyano, sulfo, alkali or ammonium salt of sulfo, carboxy, alkali or ammonium salt of carboxy, alkyl, perfluoroalkyl, alkoxy, alkylthio, amino, monoalkylamino, dialkylamino, alkylamido, or a polymerizable moiety;

each BENZO is independently —$CR^7$=$CR^8$—$CR^9$=$CR^{10}$— bonded to any two adjacent positions of $R^1$, $R^2$, $R^3$, and $R^4$, up to a maximum of two BENZO moieties;

wherein $R^7$, $R^8$, $R^9$ and $R^{10}$ are independently selected from H, halogen, cyano, sulfo, alkali or ammonium salts of sulfo, carboxy, alkali or ammonium salt of carboxy, alkyl, perfluoroalkyl, alkoxy, alkylthio, nitro, amino, monoalkylamino, dialkylamino, alkylamido, or a polymerizable moiety;

each HETERO is independently a combination of 1 to 3 carbon atoms and 1 to 3 hetero atoms selected from the group consisting of O, S and N to form a fused 5- or 6-membered heteroaromatic ring that is bonded to any two adjacent positions of $R^1$, $R^2$, $R^3$, and $R^4$ that is optionally and independently substituted by H, halogen, cyano, sulfo, alkali or ammonium salt of sulfo, carboxy, alkali or ammonium salt of carboxy, alkyl, perfluoroalkyl, alkoxy, alkylthio, amino, monoalkylamino, dialkylamino, alkylamido, or a polymerizable moiety;

the alkyl portions of all alkyl, perfluoroalkyl, alkoxy, alkylthio, monoalkylamino, dialkylamino and alkylamido groups independently have 1–18 carbon atoms in an arrangement that is either linear or branched, saturated or unsaturated; and the alkyl portions of all alkyl, perfluoroalkyl, alkoxy, alkylthio, monoalkylamino, dialkylamino and alkylamido groups are independently and optionally further substituted by H, halogen, cyano, amino, hydroxy, carboxy, alkali or ammonium salt of carboxy, mercapto, sulfo, alkali or ammonium salt of sulfo, or a polymerizable moiety.

* * * * *

UNITED STATES PATENT AND TRADEMARK OFFICE
CERTIFICATE OF CORRECTION

PATENT NO. : 6,005,113 Page 1 of 1
DATED : December 21, 1999
INVENTOR(S) : Wu et al.

It is certified that error appears in the above-identified patent and that said Letters Patent is hereby corrected as shown below:

Column 5,
Line 15, "R3'280" should read -- R3' --.

Column 9,
Line 46, "scaled" should read -- sealed --.

Column 18,
Line 26, "Compound." should read -- Compound 4. --.

Signed and Sealed this

Seventeenth Day of September, 2002

Attest:

Attesting Officer

JAMES E. ROGAN
Director of the United States Patent and Trademark Office